(12) United States Patent
Bailey

(10) Patent No.: US 10,921,849 B2
(45) Date of Patent: Feb. 16, 2021

(54) CLOCK SPRINKLERS FOR A SYSTEM ON A CHIP

(71) Applicant: Tesla, Inc., Palo Alto, CA (US)

(72) Inventor: Daniel William Bailey, Austin, TX (US)

(73) Assignee: Tesla, Inc., Palo Alto, CA (US)

( * ) Notice: Subject to any disclaimer, the term of this patent is extended or adjusted under 35 U.S.C. 154(b) by 269 days.

(21) Appl. No.: 15/974,785

(22) Filed: May 9, 2018

(65) Prior Publication Data

US 2019/0204864 A1 Jul. 4, 2019

Related U.S. Application Data

(60) Provisional application No. 62/613,089, filed on Jan. 3, 2018.

(51) Int. Cl.
| | | |
|---|---|---|
| *G06F 1/00* | (2006.01) | |
| *G06F 1/10* | (2006.01) | |
| *G06F 15/78* | (2006.01) | |
| *G06F 1/14* | (2006.01) | |

(52) U.S. Cl.
CPC .............. *G06F 1/10* (2013.01); *G06F 1/14* (2013.01); *G06F 15/7807* (2013.01); *G06F 2213/0038* (2013.01)

(58) Field of Classification Search
CPC .......... G06F 1/10; G06F 1/14; G06F 15/7807; G06F 2213/0038
See application file for complete search history.

(56) References Cited

U.S. PATENT DOCUMENTS

| | | | | |
|---|---|---|---|---|
| 6,559,701 B1* | 5/2003 | Dillon | ................. | G06F 1/10 327/293 |
| 2005/0097381 A1* | 5/2005 | Tsai | ................. | H03L 7/00 713/400 |
| 2007/0094627 A1* | 4/2007 | Komoda | ................. | G06F 30/30 716/104 |
| 2013/0083611 A1* | 4/2013 | Ware | ................. | G06F 3/0673 365/191 |
| 2018/0358970 A1* | 12/2018 | Wang | ................. | H03K 19/1774 |

* cited by examiner

*Primary Examiner* — Nitin C Patel

(74) *Attorney, Agent, or Firm* — Knobbe, Martens, Olson & Bear, LLP

(57) ABSTRACT

A System-on-a-Chip includes a plurality of processing systems and channel circuitry servicing the plurality of processing systems. The channel circuitry includes a clock sprinkler circuit, a clock source, first direction data path circuitry and second direction data path circuitry. A clock sprinkler is a clock signal that propagates in a first direction only, from a source to all destinations. The first direction data path circuitry includes a plurality of first direction data flip flops and first direction combinational logic that service data flow in the first direction. The second direction data path circuitry includes a plurality of second direction data flip flops and second direction combinational logic that service data flow in the second direction. Clock/data skew in a second direction is greater than clock/data skew in a first direction, the first direction data flip flops are located based upon the clock/data skew in the first direction and the second direction data flip flops are located based upon the clock/data skew in the second direction.

20 Claims, 15 Drawing Sheets

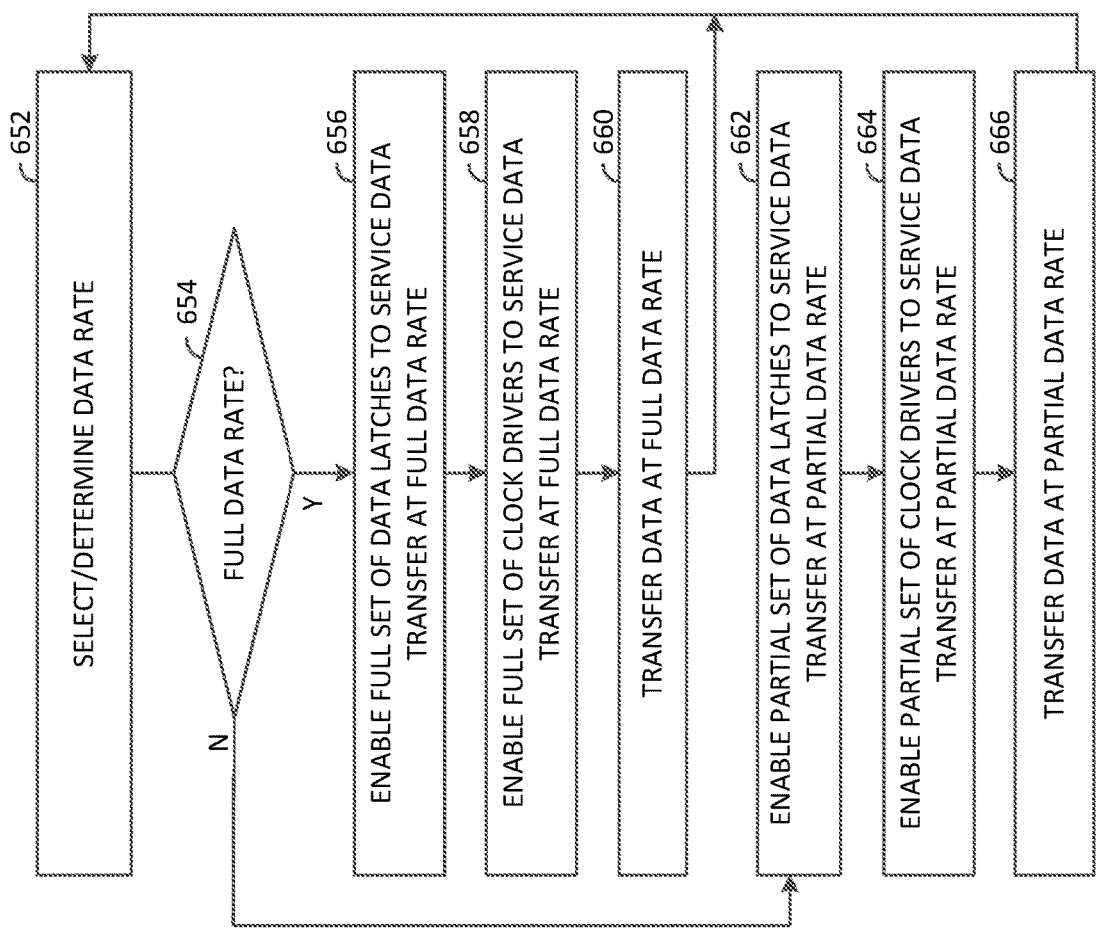

CLOCK SPRINKLERS FOR A SYSTEM ON A CHIP

CROSS-REFERENCE TO RELATED APPLICATION

The present U.S. Utility Patent Application claims priority pursuant to 35 U.S.C. § 119(e) to U.S. Provisional Application No. 62/613,089, entitled "BUS/CLOCK STRUCTURE FOR SYSTEM ON A CHIP", filed Jan. 3, 2018, which is hereby incorporated herein by reference in its entirety and made part of the present U.S. Utility Patent Application for all purposes.

BACKGROUND

Technical Field

The present disclosure relates to a System on a Chip (SoC) including a plurality of separate processing systems; and more particularly to channel circuitry formed between and among the plurality of separate processing systems of the SoC.

Description of Related Art

FIG. 1A is a block diagram illustrating a prior art SoC 100 that includes a plurality of processing systems 102A-102L arranged on a single integrated circuit. Each of the processing systems 102A-102L performs corresponding processing functions. A channel was located among and between the plurality of processing systems 102A-102L. Channel circuitry 104 contained in the channel services data transfers between the plurality of processing systems 102A-102L and may perform additional processing functions.

All of the plurality of processing systems 102A-102L and the channel circuitry 104 requires one or more clocks. With some prior art SoCs, a common clock was distributed across all or substantially all of the area of the SoC 100. The common clock was used not only to clock the plurality of processing systems 102A-102L but also to clock the channel circuitry. One particular structure for distributing the common clock across the SoC 100 was referred to as an H-tree clock network. Another particular prior structure for distributing the common clock across the SoC 100 was referred to as a binary tree network. Each of these clock distribution structures distributed the common clock across the SoC 100 such that the clock was approximately in phase at all clock termination points of both the plurality of processing systems 102A-102L and the channel circuitry 104. These clock distribution structures, however, required routing of the clock across all areas of the SoC 100.

Many of the processing systems 102A-102L, however, may be proprietary designs, having their own clock distribution structures, and not allowing modification of circuitry in their respective areas of the SoC 100. Thus, with some prior SoCs, a dedicated clock distribution structure serviced only the channel circuitry. Some SoCs used an H-tree clock distribution structure to generate a common clock across all components of the channel circuitry and may require block displacement and a commensurate area increase. Other SoCs used a binary tree clock distribution structure to generate a common clock across all components of the channel circuitry. Because the components of the channel circuitry were distributed across the SoC 100, using either of these clock tree structures was very complex to construct and analyze.

Another clock scheme used for channel circuitry of other prior SoCs was referred to as a source synchronous clock scheme, which included transmitting a clock along with data on the channel circuitry 104. This technique required each processing system 102A-102L to generate a clock, resulting in increased timing complexity and analysis because data is propagated along the channel circuitry 104 in differing directions, differing servicing clocks propagated in differing directions.

SUMMARY

Embodiments of the present disclosure are directed towards a System on a Chip (SoC). According to a first embodiment of the present disclosure, a SoC includes a plurality of processing systems and channel circuitry coupled to and residing among the plurality of processing systems. The channel circuitry includes a clock sprinkler circuit including a main clock branch, a clock source, first direction data path circuitry and second direction data path circuitry. The clock source couples to a first end of the main clock branch and couples a clock signal to the first end of the main clock branch that propagates in a first direction along the main clock branch from the first end of the main clock branch towards a second end of the main clock branch.

The first direction data path circuitry includes a plurality of first direction data flip flops clocked by the clock sprinkler circuit and servicing data flow in the first direction data and first direction combinational logic intercoupled to the plurality of first direction data flip flops and servicing data flow in the first direction. The second direction data path circuitry includes a plurality of second direction data flip flops clocked by the clock sprinkler circuit and servicing data flow in a second direction that is opposite the first direction and second direction combinational logic intercoupled to the plurality of second direction data flip flops and servicing data flow in the second direction.

The SoC of the first embodiment provides important advantages as compared to prior SoCs. In particular, a single clock source provides a clock signal for all portions of the channel circuitry. With the clock signal propagating in the first direction, the design of the channel circuitry is simplified. Further, because the clock circuitry resides with the channel circuitry, channel circuitry clock routing does not require access of the footprints of the plurality of processing systems. Resultantly, the design of the channel circuitry is more efficient and resultantly, more cost effective than prior SoCs.

The first embodiment includes at least one optional aspect. These aspects may be applied to the first embodiment individually or in various combinations. According to a first aspect of the first embodiment, propagation of the clock signal in the first direction introduces clock skew along the main clock branch. Propagation of first data on the first direction data path circuitry introduces first data delay along the first direction data path circuitry and placement of the plurality of first direction data flip flops is determined based upon the clock skew and the first data delay along the first direction data path circuitry. Further, according to this first aspect, propagation of second data on the second direction data path circuitry introduces second data delay along the second direction data path circuitry and placement of the plurality of second direction data flip flops is determined based upon the clock skew and the second data delay along the second direction data path circuitry.

According to a second aspect of the first embodiment, clock/data skew in a second direction is greater than clock/ data skew in a first direction, the first direction data flip flops are located based upon the clock/data skew in the first direction, and the second direction data flip flops are located based upon the clock/data skew in the second direction.

According to a third aspect of the first embodiment, the plurality of processing systems has a respective plurality of processing system areas on a semiconductor die, the channel circuitry resides in a channel circuitry area on the semiconductor die, and the channel circuitry area and the respective plurality of processing system areas are non-overlapping.

According to a fourth aspect of the first embodiment, the clock sprinkler circuit further includes a plurality of clock drivers and during a reduced power mode operation some of the plurality of clock drivers are disabled.

According to a fifth aspect of the first embodiment, a processing system of the plurality of processing systems includes a local clock domain that is based upon the clock signal.

According to a sixth aspect of the first embodiment, the clock sprinkler circuit further includes a clock sprinkler connection coupled to the second end of the main clock branch and a plurality of secondary clock branches. The first direction data path circuitry further includes, for each of the plurality of secondary clock branches, first direction secondary data path circuitry having a plurality of first direction secondary data flip flops clocked by a corresponding secondary clock branch and servicing data flow in the first direction data and first direction secondary combinational logic coupled to the plurality of first direction secondary data flip flops and servicing data flow in the first direction. The second direction data path circuitry further includes, for each of the plurality of secondary clock branches, second direction secondary data path circuitry having a plurality of second direction secondary data flip flops clocked by the corresponding secondary clock branch and servicing data flow in the second direction data and second direction secondary combinational logic coupled to the plurality of second direction secondary data flip flops and servicing data flow in the second direction.

With an additional structure of the sixth aspect, the clock signal propagates in the first direction through the clock sprinkler connection and along each of the plurality of secondary clock branches introducing clock skew along each of the plurality of secondary clock branches, propagation of first data on the first direction secondary data path circuitry introduces first secondary data delay, placement of the plurality of first direction secondary data flip flops is determined based upon the clock skew along the plurality of secondary clock branches and the first secondary data delay, propagation of second data on the second direction secondary data path circuitry introduces second secondary data delay, and placement of the plurality of second direction secondary data flip flops is determined based upon the clock skew along the plurality of secondary clock branches and the second secondary data delay.

According to a seventh aspect of the first embodiment, the clock sprinkler circuit further includes a clock sprinkler sub-connection coupled to the second end of a secondary clock branch and a plurality of sub-secondary clock branches. Further, with this seventh aspect, the first direction data path circuitry further includes, for each of the plurality of sub-secondary clock branches, a plurality of first direction sub-secondary data flip flops clocked by a corresponding sub-secondary clock branch and servicing data flow in the first direction data and first direction sub-secondary combinational logic coupled to the plurality of first direction sub-secondary data flip flops and servicing data flow in the first direction. Also, according to this seventh aspect, the second direction data path circuitry further includes, for each of the plurality of secondary clock branches, a plurality of second direction sub-secondary data flip flops clocked by the corresponding sub-secondary clock branch and servicing data flow in the second direction data and second direction sub-secondary combinational logic coupled to the plurality of second direction sub-secondary data flip flops and servicing data flow in the second direction.

A second embodiment of the present disclosure is directed to a SoC having a plurality of processing systems and channel circuitry coupled to and residing among the plurality of processing systems. The channel circuitry includes a clock sprinkler circuit including a main clock branch, a clock source, first direction data path circuitry, and second direction data path circuitry. The clock source couples to a first end of the main clock branch and couples a clock signal to the first end of the main clock branch that propagates in a first direction along the main clock branch from the first end of the main clock branch towards a second end of the main clock branch. The first direction data path circuitry includes a plurality of first direction channel circuit blocks that service data flow in the first direction and includes first direction logic gates and a plurality of first direction data flip flops clocked by the clock sprinkler circuit. The second direction data path circuitry includes a plurality of second direction channel circuit blocks that service data flow in the first direction, that include second direction logic gates, and that include a plurality of second direction data flip flops clocked by the clock sprinkler circuit.

The second embodiment includes at least one optional aspect. These aspects may be applied to the first embodiment individually or in various combinations. According to a first aspect of the second embodiment, propagation of the clock signal in the first direction introduces clock skew along the main clock branch, propagation of first data on the first direction data path circuitry introduces first data delay along the first direction data path circuitry, placement of the plurality of first direction data flip flops is determined based upon the clock skew and the first data delay along the first direction data path circuitry, propagation of second data on the second direction data path circuitry introduces second data delay along the second direction data path circuitry, and placement of the plurality of second direction data flip flops is determined based upon the clock skew and the second data delay along the second direction data path circuitry.

According to a second aspect of the second embodiment, clock/data skew in a second direction is greater than clock/data skew in a first direction, the first direction data flip flops are located based upon the clock/data skew in the first direction, and the second direction data flip flops are located based upon the clock/data skew in the second direction.

According to a third aspect of the third embodiment, the plurality of processing systems has a respective plurality of processing system areas on a semiconductor die, the channel circuitry resides in a channel circuitry area on the semiconductor die, and the channel circuitry area and the respective plurality of processing system areas are non-overlapping.

Other aspects of the third embodiment include the aspects described above regarding the first embodiment.

A third embodiment of the present disclosure addresses a method for operating a SoC that includes a plurality of processing systems and channel circuitry. The method of the third embodiment includes generating a clock signal, transmitting the clock signal in first direction on a clock sprinkler circuit within one or more channels of the SoC along a main clock branch, the clock signal having clock skew along the clock sprinkler circuit, transferring data within one or more channels of the SoC in the first direction along first direction data path circuitry that includes a plurality of first direction channel circuit blocks that service data flow in the first direction and that are clocked by the clock sprinkler circuit and that intercouple the plurality of first direction channel circuit blocks, and transferring data within one or more channels of the SoC in a second direction along second direction data path circuitry that includes a plurality of second direction channel circuit blocks that service data flow in the second direction and that are clocked by the clock sprinkler circuit and that intercouple the plurality of second direction channel circuit blocks.

According to a first aspect of the third embodiment, propagation of first data on the first direction data path circuitry introduces first data delay along the first direction data path circuitry, placement of a plurality of first direction data flip flops is determined based upon the clock skew and the first data delay along the first direction data path circuitry, propagation of second data on the second direction data path circuitry introduces second data delay along the second direction data path circuitry, and placement of a plurality of second direction data flip flops is determined based upon the clock skew and the second data delay along the second direction data path circuitry.

According to a second aspect of the third embodiment, clock/data skew in a second direction is greater than clock/data skew in a first direction, the plurality of first direction data flip flops are located based upon the clock/data skew in the first direction, and the plurality of second direction data flip flops are located based upon the clock/data skew in the second direction.

The third embodiment may also encompass the operational aspects of the aspects described with reference to the first and second embodiments. Further, the second and third embodiments provide similar benefits as those described with reference to the first embodiment. These and other benefits of the disclosed embodiments will become apparent from reading the detailed description below with reference to the drawings.

BRIEF DESCRIPTION OF THE SEVERAL VIEWS OF THE DRAWINGS

FIG. 7 is a flow chart illustrating a method for selectively enabling data flip flops and clock drivers according to an aspect of the present disclosure.

DETAILED DESCRIPTION OF THE DISCLOSURE

Figure 1A:
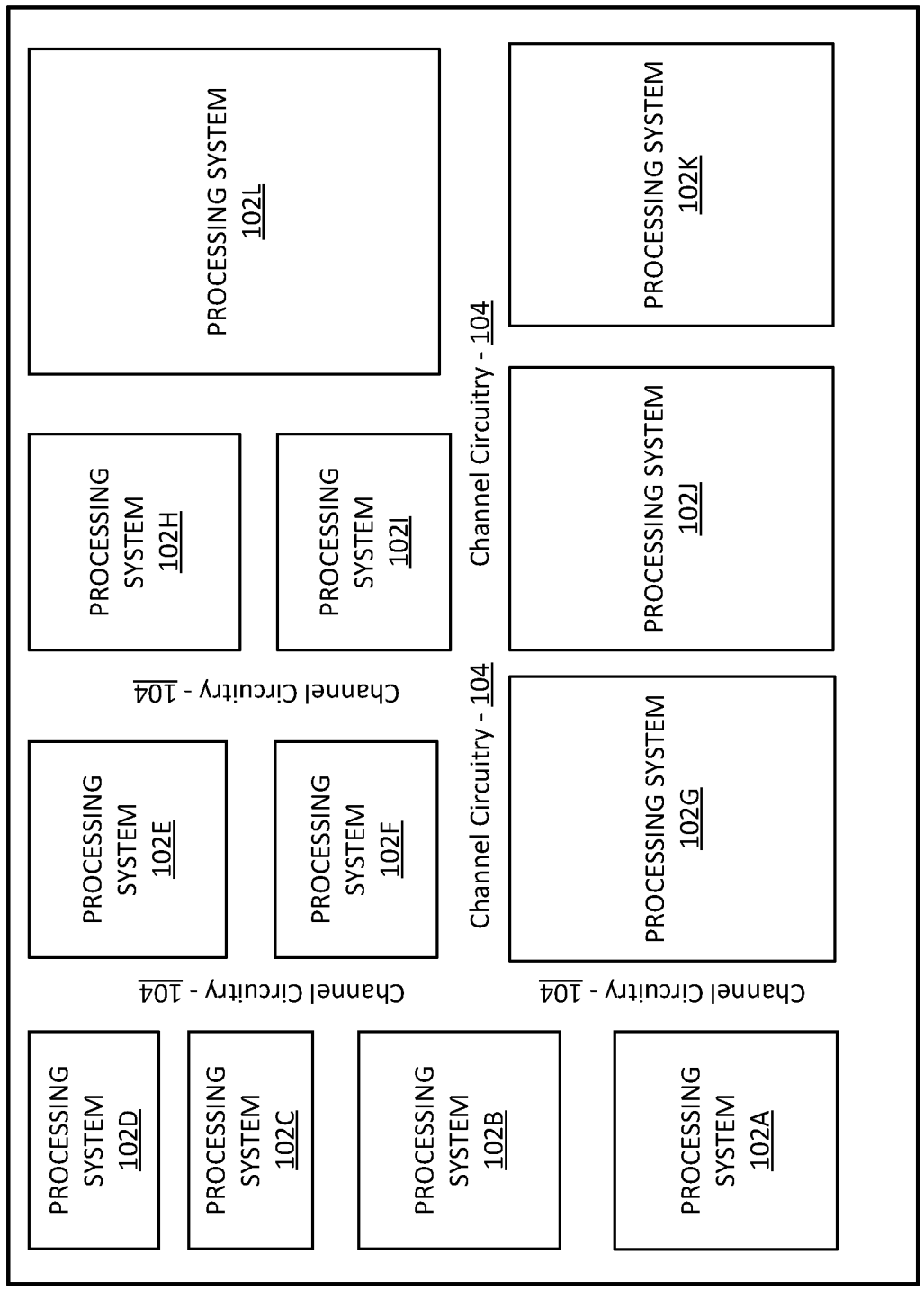
FIG. 1A is a block diagram illustrating a prior art System on a Chip (SoC).
Figure 1B:
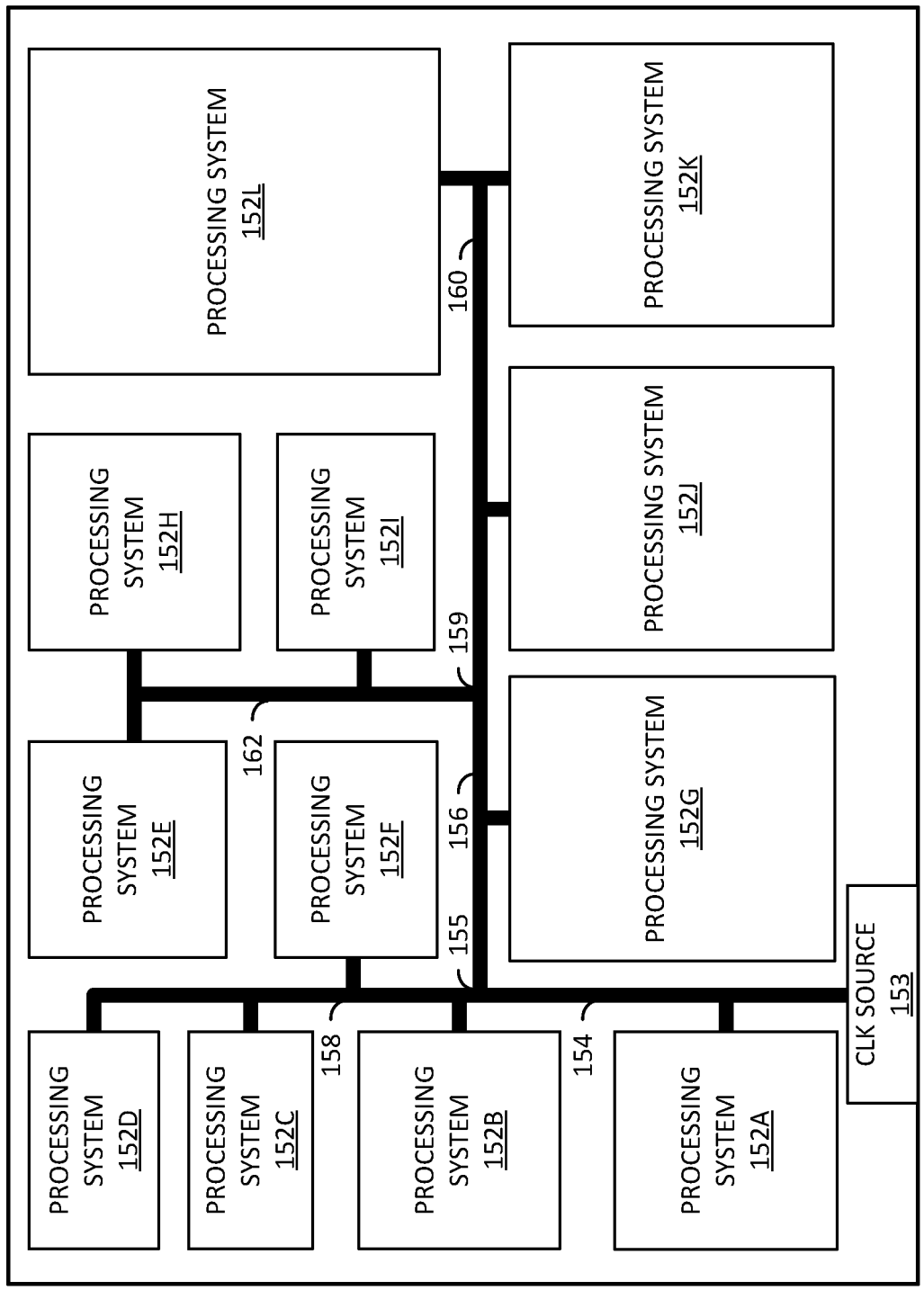
FIG. 1B is a block diagram illustrating a SoC constructed and operating according to an embodiment of the present disclosure.

FIG. 1B is a block diagram illustrating a SoC 150 constructed and operating according to an embodiment of the present disclosure. The SoC 150 includes a plurality of processing systems 152A, 152B, 152C, 152D, 152E, 152F, 152G, 152H, 152I, 152J, 152K, and 152L. These processing systems 152A-152L perform respective functions and have respective structures, e.g., general processor, communications processor (cellular, WiFi, Bluetooth, etc.), network interface processor, image processor, audio processor, graphics processor, arithmetic unit processor, security processor, safety processor, and human interaction processor, memory controller, and computer bus interface processors, among other processing structures. SoCs are often smaller, less expensive, and consume less power than a device that includes separate processing systems. Particular examples of a SoC 150 relating to autonomous driving will be described further herein with reference to FIGS. 10, 11A, and 11B.

The plurality of processing systems 152A-152L may be designed by one or more third parties and licensed for use in the SoC 150. In such case, the functionality of these processing systems 152A-152L and their structures may not be alterable in the construction or manufacture of the SoC 150. Further, in some embodiments, at least some of the processing systems 152A-152L include respective proprietary designs that must be formed in the SoC 150 without modification of any type, such as circuit component placement and metal layer conductor routing. In such case, the footprint of at least some of the processing systems 152A-152L is not available to service SoC 150 communication interface requirements.

Figure 1C:
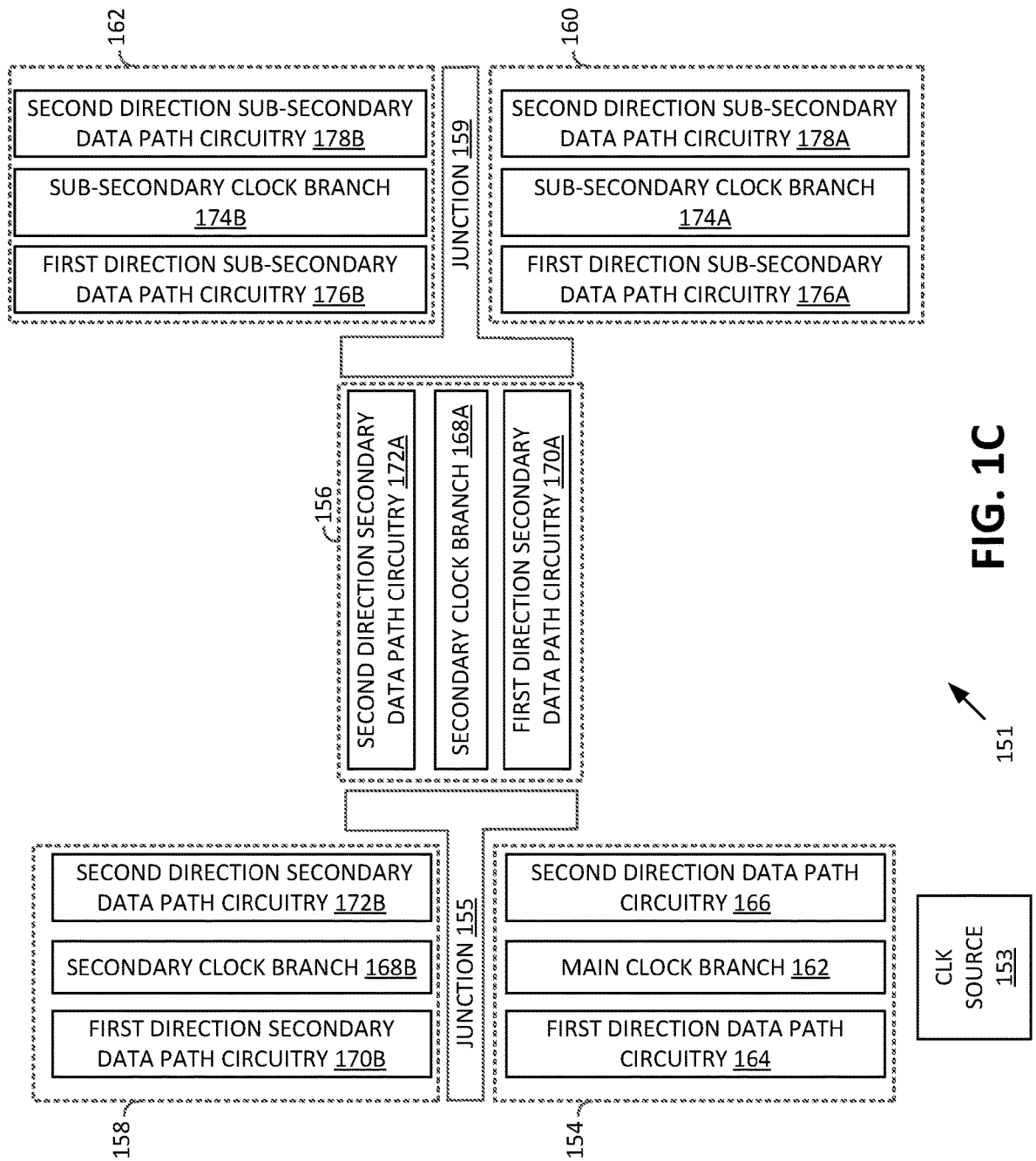
FIG. 1C is a block diagram illustrating channel circuitry of the SoC of FIG. 1B.

FIG. 1C is a block diagram illustrating channel circuitry 151 of the SoC 150 of FIG. 1B. Referring to both FIG. 1B and FIG. 1C, according to the present disclosure, the SoC 150 includes channel circuitry 151 coupled to and residing among the plurality of processing systems 152A-152L. The channel circuitry 151 includes a main portion 154, two or more secondary portions 156 and 158 that couple to the main portion 154 at junction 155, and two or more sub-secondary portions 160 and 162 that couple to the secondary portion 156 at junction 159. The main portion 154 of the channel circuitry couples to and services processing system 152A and includes a main clock branch, first direction data path circuitry 164, and second direction data path circuitry 166. Secondary portion 156 of the channel circuitry couples to and services processing system 152G and includes secondary clock branch 168A, first direction secondary data path circuitry 170A, and second direction secondary data path circuitry 172A. Secondary portion 158 of the channel circuitry couples to and services processing systems 152B, 152C, 152D, and 152F and includes secondary clock branch 168B, first direction secondary data path circuitry 170B, and second direction secondary data path circuitry 172B. Sub-secondary portion 160 of the channel circuitry couples to and services processing systems 152J, 152K, and 152L and includes sub-secondary clock branch 174A, first direction sub-secondary data path circuitry 176A, and second direction sub-secondary data path circuitry 178A. Finally, sub-secondary portion 162 of the channel circuitry couples to and services processing systems 152E, 152H, and 152I and includes sub-secondary clock branch 174B, first direction sub-secondary data path circuitry 176B, and second direction sub-secondary data path circuitry 178B.

The clock circuitry propagates a clock signal produced by a clock source 153 in a first direction only along the channel, from a source to all destinations. This results in a channel clock that is much simpler to construct and analyze than prior art because the common clock point for any two flip flops in a data path are close. With the embodiment of FIGS. 1B and 1C, propagation of the clock signal in the first direction introduces clock skew along the main clock branch. Further, propagation of first data on the first direction data path circuitry introduces first data delay in the first direction. Placement of the plurality of first direction data flip flops (or latches) of the first direction data path circuitry is determined based upon the clock skew and the first data delay along the first direction data path circuitry. Moreover, propagation of second data on the second direction data path circuitry introduces second data delay along the second direction data path circuitry and placement of the plurality of second direction data flip flops is determined based upon the clock skew and the second data delay along the second direction data path circuitry.

Further, the clock signal propagates in the first direction through the clock sprinkler connection and along each of the plurality of secondary clock branches introducing clock skew along each of the plurality of secondary clock branches. Propagation of first data on the first direction secondary data path circuitry introduces first secondary data delay along the first direction secondary data path circuitry. Thus, placement of the plurality of first direction secondary data flip flops is determined based upon the clock skew along the plurality of secondary clock branches and the first secondary data delay along the first secondary direction data path circuitry. Additionally, propagation of second data on the second direction secondary data path circuitry introduces second secondary data delay along the second direction secondary data path circuitry. Thus, placement of the plurality of second direction secondary data flip flops is determined based upon the clock skew along the plurality of secondary clock branches and the second secondary data delay along the second secondary direction data path circuitry. These same concepts apply to the sub-secondary First data propagates along the first direction data path circuitry in the first direction causing first clock/data skew. Second data propagates along the second direction data path circuitry in the second direction, which is opposite the first direction, causing clock/data skew in the second direction. Generally, clock/data skew in the second direction is greater than clock/data skew in the first direction because the first data propagates with the clock while the second data propagates against the clock. While the first direction data flip flops are located based upon the clock/data skew in the first direction, the second direction data flip flops are located based upon the clock/data skew in the second direction. Generally, second direction data flip flops must be spaced more closely than the first direction data flip flops to avoid data loss. This concept applies to all portions of the channel circuitry. This concept will be described more fully with reference to FIGS. 2-5.

According to an additional aspect of the SoC of FIGS. 1B and 1C, the plurality of processing systems 152A-152L has a respective plurality of processing system areas on a semiconductor die. The channel circuitry resides in a channel circuitry area on the semiconductor die and the channel circuitry area and the respective plurality of processing system areas are non-overlapping. This aspect facilitates isolation of the clock and data path circuitry of the channel from the plurality of processing systems 152A-152L, which may be required due to lack of access to processing system designs and/or precluded access from the areas on the semiconductor die of the plurality of processing systems.

According to another additional aspect of the SoC of FIGS. 1B and 1C, the clock sprinkler circuit further includes a plurality of clock drivers, some of which, during a reduced power mode operation, are disabled. Disabling the clock drivers may correspond to a reduction in clock frequency. Further, during the reduced power mode of operation, some data flip flops may be disabled. This aspect will be described further herein with reference to FIG. 7.

Figure 2:
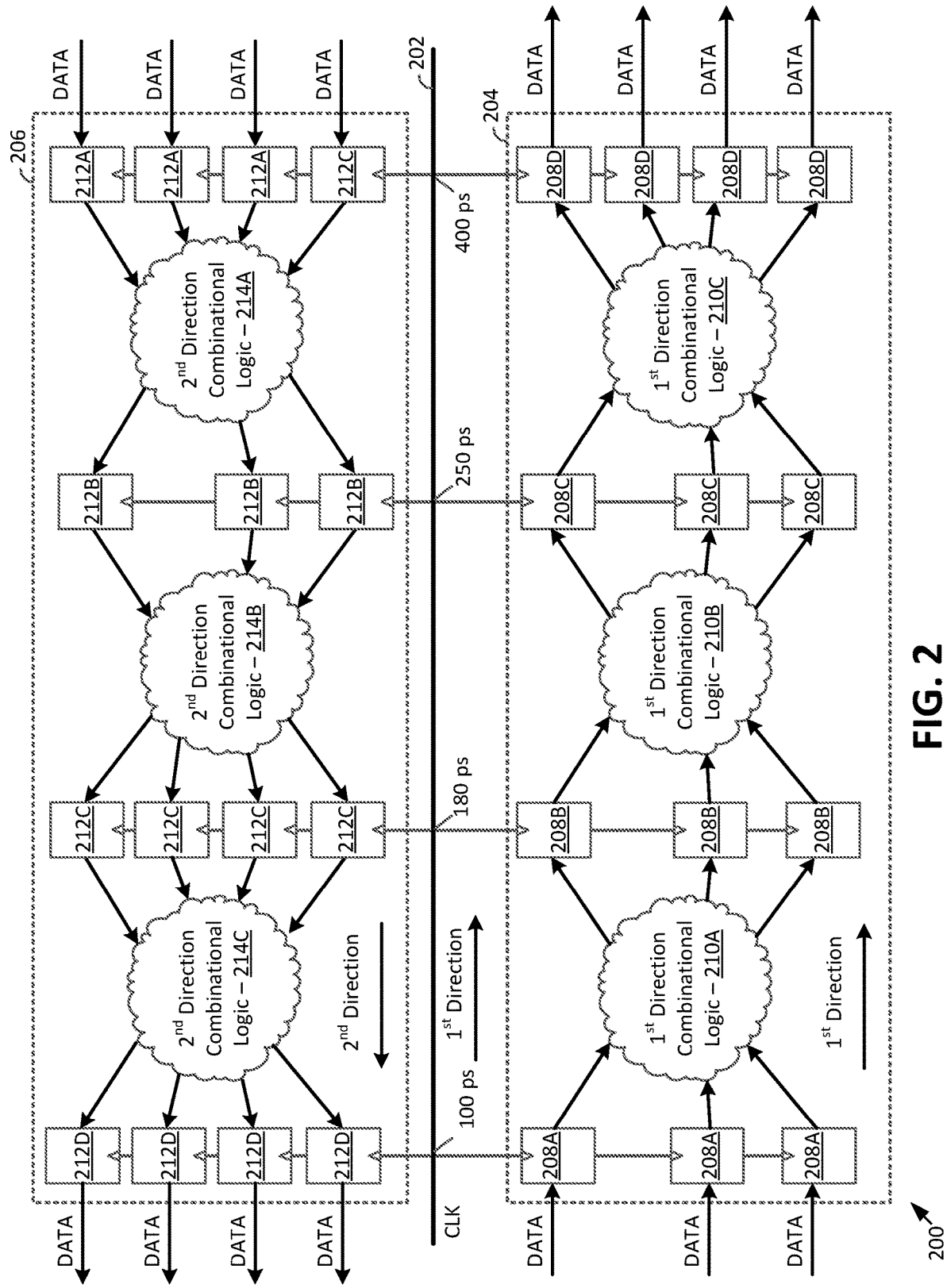
FIG. 2 is a block diagram illustrating an embodiment of channel circuitry of the SoC of FIG. 1B according to the present disclosure.

FIG. 2 is a block diagram illustrating an embodiment of channel circuitry of the SoC of FIGS. 1B and 1C according to the present disclosure. The channel circuitry 200 illustrated in FIG. 2 is an example of a portion of the channel circuitry of the main portion 154, the secondary portions 156 and/or 158, and/or the sub-secondary portions 160 and/or 162 of FIG. 1B. The channel circuitry 200 of FIG. 2 includes a portion the clock sprinkler circuit 202, a portion of the first direction data path circuitry 204, and a portion the second direction data path circuitry 206. The portion of the clock sprinkler circuitry 202 illustrated in FIG. 2 services propagation of the clock signal in the first direction (as indicated). Shown are various clock skews and their relative locations along the clock sprinkler circuit 202.

The first direction data path circuitry 204 of FIG. 2 includes a plurality of first direction data flip flops 208A, 208B, 208C and 208D that are clocked by the clock sprinkler circuit 202 and first direction combinational logic 210A, 210B, and 210C intercoupled to the plurality of first direction data flip flops 208A, 208B, 208C, and 208D that together service data flow in the first direction. The second direction data path circuitry 206 includes a plurality of second direction data flip flops 212A, 212B, 212C, and 212D that are clocked by the clock sprinkler circuit and second direction combinational logic 214A, 214C, and 214D that are intercoupled with the plurality of second direction data flip flops 212A, 212B, 212C, and 212D that together service data flow in the second direction.

The data flip flops 208A-208D serve to latch data as the data passes in the first direction through the first direction combinational logic 210A-210C. A number of data flip flops of each group of first direction data flip flops 208A, 208B, and 208C may vary at each stage based upon a number of bits of data being latched at that particular stage of the first direction data path circuitry. Each of the first direction combinational logic 210A, 210B, and 210C includes a plurality of logic gates to perform a particular logic function and may further include memory. Each of first direction combinational logic 210A, 210B and 210C performs a respective logic function on the first direction data as it propagates in the first direction. The logic functions performed are determined based upon an overall design of the channel circuitry, including the manner that it intercouples to service the plurality of processing systems, and the various other data processing functions that it performs.

The second direction data path circuitry 206 of FIG. 2 includes a plurality of second direction data flip flops 212A, 212B, 212C and 212D that are clocked by the clock sprinkler circuit 202 and second direction combinational logic 214A, 214B, and 214C intercoupled to the plurality of second direction data flip flops 212A, 212B, 212C, and 212D that together service data flow in the second direction. The second direction data path circuitry 206 includes a plurality of second direction data flip flops 212A, 212B, 212C, and 212D that are clocked by the clock sprinkler circuit and second direction combinational logic 214A, 214C, and 214D that are intercoupled to the plurality of second direction data flip flops 212A, 212B, 212C, and 212D that together service data flow in the second direction.

The data flip flops 212A-212D serve to latch data as the data passes in the second direction through the second direction combinational logic 214A-214C. A number of data flip flops of each group of second direction data flip flops 212A, 212B, and 212C may vary at each stage based upon a number of bits of data being latched at that particular stage of the second direction data path circuitry. Each of the second direction combinational logic 214A, 214B, and 214C includes a plurality of logic gates to perform a particular logic function and may further include memory. Each of second direction combinational logic 214A, 214B and 214C performs a respective logic function on the second direction data as it propagates in the second direction. The logic functions performed are determined based upon an overall design of the channel circuitry, including the manner that it intercouples to service the plurality of processing systems, and the various other data processing functions that it performs.

With the embodiment of FIG. 2, propagation of the clock signal in the first direction introduces clock skew along the main clock branch as shown as 100 ps, 180 ps, 250 ps, and 400 ps. These numbers are for illustration only. Further, propagation of first data on the first direction data path circuitry 204 introduces first data delay along the first direction data path circuitry 204. As will be further illustrated in FIG. 5 and described therewith, the first direction data path circuitry 204 has delay associated with the first directional combinational logic 210A, 210B, and 210C due to their logic gates and multiple levels of logic. As is evident, therefore, the first data delay along the first direction data circuitry 204 would typically differ from the clock delay that caused the clock skew and the first direction data will be out of sync with the clock signal. Thus, placement of the plurality of first direction data flip flops 208A, 208B, 208C, and 208D is determined based upon the clock skew and the first data delay along the first direction data path circuitry. In other words, the delay caused by the first direction combinational logic 210A, 210C, and 210C causes clock/data skew in the first direction and placement of the first direction data flip flops 208A, 208B, 208C, and 208D must be sufficiently close together to preclude loss of data due to the delay in the first direction combinational logic 210A, 210B, and 210C. Further, the designs of the first direction combinational logic 210A, 210B, and 210C must be such that their delay of operation does not cause there to be clock/data skew that would cause loss of data.

Further, propagation of second data on the second direction data path circuitry 206 introduces second data delay along the second direction data path circuitry 206. As will be further illustrated in FIG. 5 and described therewith, the second direction data path circuitry 206 has delay associated with the second directional combinational logic 214A, 214B, and 214C due to their logic gates and multiple levels of logic. As is evident, therefore, the second data delay along the clock sprinkler circuit 202 opposes the clock skew so that it is more out of sync with the clock signal than is the first direction data path circuitry 204. Thus, placement of the plurality of second direction data flip flops 212A, 212B, 212C, and 212D is determined based upon the clock skew and the second data delay along the second direction data path circuitry. In other words, the delay caused by the second direction combinational logic 214A, 214C, and 214C causes clock/data skew in the second direction and placement of the second direction data flip flops 212A, 212B, 212C, and 212D must be sufficiently close together to preclude loss of data due to the delay in the second direction combinational logic 214A, 214B, and 214C. Further, the designs of the second direction combinational logic 214A, 214B, and 214C must be so that their delay of operation does not cause there to be clock/data skew that would cause loss of data.

Generally, data flip flops 212A-212D of the second direction data path circuitry 206 must have less data delay therebetween than the data flip flops 208A-208D of the first direction data path circuitry 204 because the second data flow in the second direction opposes the propagation of the clock. Stated somewhat differently, clock/data skew in the second direction is greater than clock/data skew in the first direction, the first direction data flip flops 208A-208D are located based upon the clock/data skew in the first direction and the second direction data flip flops 212A-212D are located based upon the clock/data skew in the second direction.

Figure 3A:
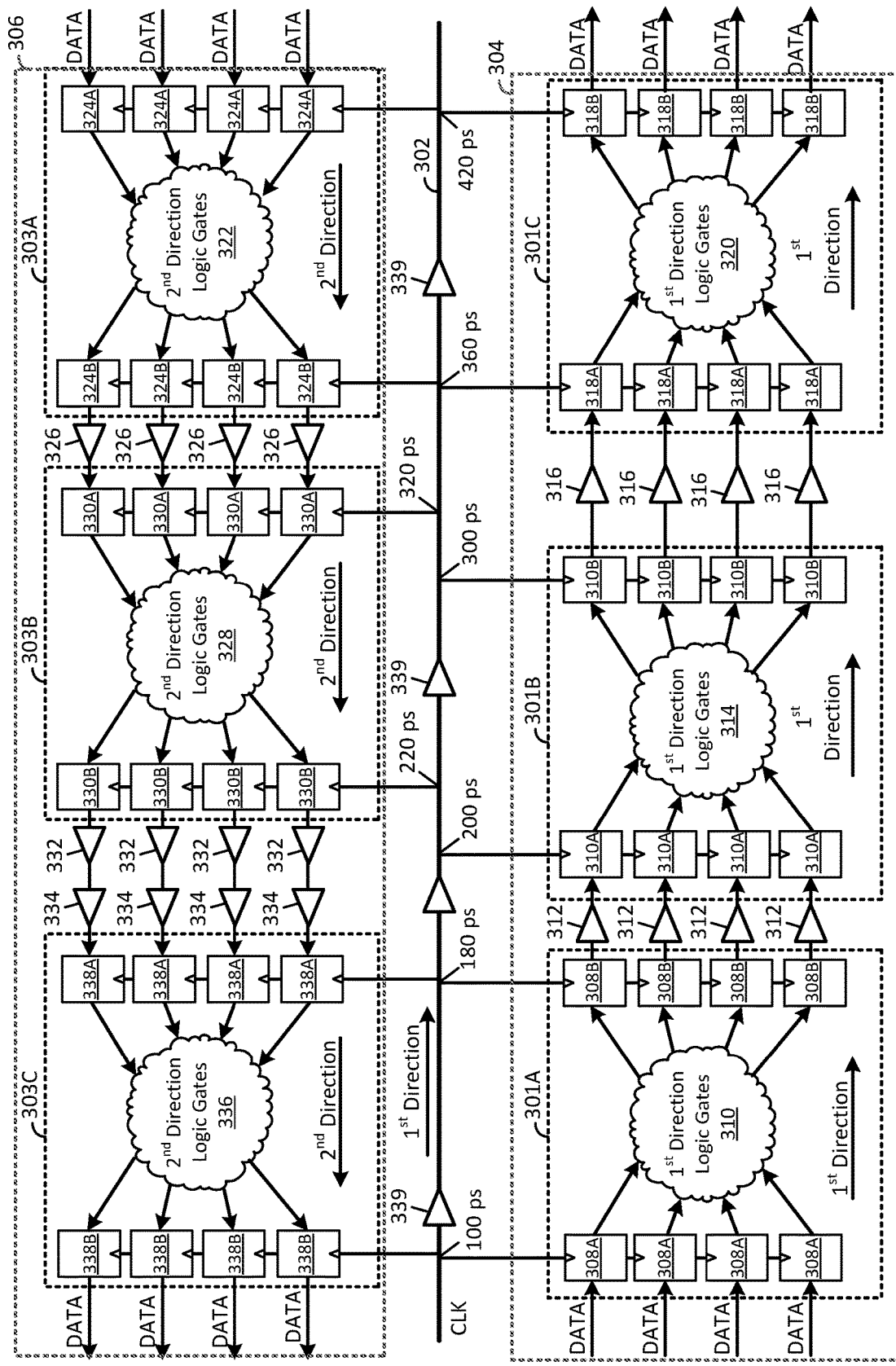
FIG. 3A is a block diagram illustrating another embodiment of channel circuitry of the SoC of FIG. 1B according to the present disclosure.

FIG. 3A is a block diagram illustrating another embodiment of channel circuitry of the SoC of FIGS. 1B and 1C according to the present disclosure. The channel circuitry 300 illustrated in FIG. 3A is an example of a portion of the channel circuitry of the main portion 154, the secondary portions 156 and/or 158, and/or the sub-secondary portions 160 and/or 162 of FIG. 1B. The channel circuitry 300 of FIG. 3 includes the clock sprinkler circuit 302, a portion of the first direction data path circuitry 304, and a first portion of the second direction data path circuitry 306. The portion of the clock sprinkler circuitry 302 illustrated in FIG. 3 services propagation of the clock signal in the first direction (as indicated). Shown are various clock skews and their relative locations along the clock sprinkler circuit 302.

The first direction data path circuitry 304 of FIG. 3A includes a plurality of first direction channel circuit blocks 301A, 301B, and 301C that are clocked by the clock sprinkler circuit 302. The first direction channel circuit blocks 301A, 301B, and 301C include first direction logic gates 310, 314, and 320, respectively, and first direction data flip flops 308A, 308B, 310A, 310B, 318A, and 318B that together service data flow in the first direction. Drivers 312 intercouple first direction channel circuit block 301A to first direction channel circuit block 301B. Drivers 316 intercouple first direction channel circuit block 301B to first direction channel circuit block 301C. Data flip flops 308A-318B and drivers 312 and 316 may be selectively enabled based upon clock frequency and/or immediate data requirements.

The second direction data path circuitry 306 of FIG. 3A includes a plurality of second direction channel circuit blocks 303A, 303B, and 303C that are clocked by the clock sprinkler circuit 302. The second direction channel circuit blocks 303A, 303B, and 303C include second direction logic gates 322, 328, and 336, respectively, and second direction data flip flops 324A, 324B, 330A, 330B, 338A, and 338B that together service data flow in the second direction. Drivers 326 intercouple second direction channel circuit block 303A and second direction channel circuit block 303B. Drivers 332 and 334 intercouple second direction channel circuit block 303B and second direction channel circuit block 303C. Second direction data flip flops 324A-338B and the drivers 326, 332, and 324 may be selectively enabled based upon clock frequency and/or immediate data requirements.

With the embodiment of FIG. 3A, propagation of the clock signal in the first direction introduces clock skew along the main clock branch as shown as 100 ps, 180 ps, 200 ps, 300 ps, 320 ps, 360 ps, and 420 ps. These numbers are for illustration only. Further, propagation of first data on the first direction data path circuitry 304 introduces first data delay along the first direction data path circuitry. As will be further illustrated in FIG. 5 and described therewith, the first direction data path circuitry 304 has delay associated with the first direction channel circuit blocks 301A, 301B, and 301C due to their logic gates, their data flip flops, and the drivers there between. As is evident, therefore, the first data delay along the first direction data path circuitry 304 would then typically differ from the delay that caused the clock skew, and the first direction data will be out of sync with the clock signal. Thus, placement of the plurality of first direction data flip flops 308A-318B is determined based upon the clock skew and the first data delay along the first direction data path circuitry 304. In other words, the delay caused by the first direction data path circuitry causes clock/data skew in the first direction and placement of the first direction data flip flops 308A-318B must be sufficiently close together to preclude loss of data due to the delay of the first direction data. Further, the designs of the first direction logic gates 310, 314, and 320 must be so that their delay of operation does not cause there to be clock/data skew that would cause loss of data.

Further, propagation of second data on the second direction data path circuitry 306 introduces second data delay along the second direction data path circuitry 306. As will be further illustrated in FIG. 5 and described therewith, the second direction data path circuitry 306 has delay associated with the second direction logic gates 322, 328, and 336. As is evident, therefore, the second data delay along the second direction data path circuitry 306 opposes the clock signal causing the clock/data skew to be greater in the second direction than in the first direction. Thus, placement of the plurality of second direction data flip flops 312A, 312B, 312C, and 312D is determined based upon the clock skew and the second data delay along the second direction data path circuitry. In other words, the delay caused by the components in the second direction causes clock/data skew for the second direction data and placement of the second direction data flip flops 324A-338B must be sufficiently close together to preclude loss of data due to the delay in the second direction. Further, the designs of the second direction logic gates 322, 328, and 336 must be so that their delay of operation does not cause there to be clock/data skew that would cause loss of data.

Generally, second direction data flip flops 324A-338B of the second direction data path circuitry 306 must have less data delay therebetween than the data flip flops 308A-318B of the first direction data path circuitry 304 because the second data flow in the second direction opposes the propagation of the clock. Stated somewhat differently, clock/data skew in the second direction is greater than clock/data skew in the first direction, the first direction data flip flops 308A-318D are located based upon the clock/data skew in the first direction and the second direction data flip flops 324A-338B are located based upon the clock/data skew in the second direction.

Figure 3D:
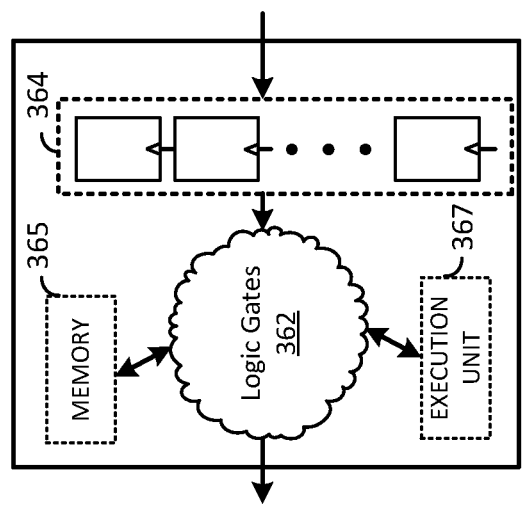
FIGS. 3B, 3C, and 3D are block diagrams illustrating various channel circuit blocks of the channel circuitry of the SoC of FIG. 1B according to the present disclosure.
Figure 3C:
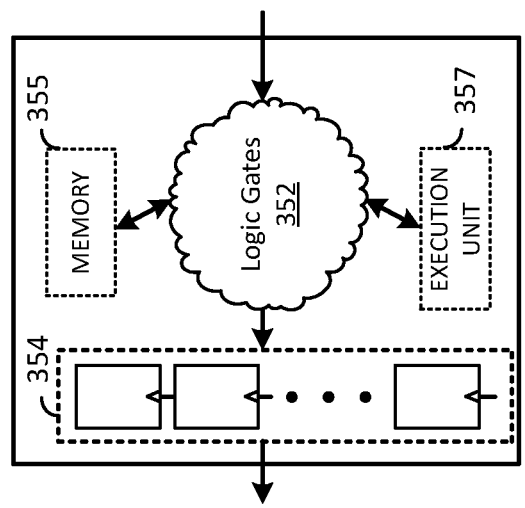
Figure 3B:
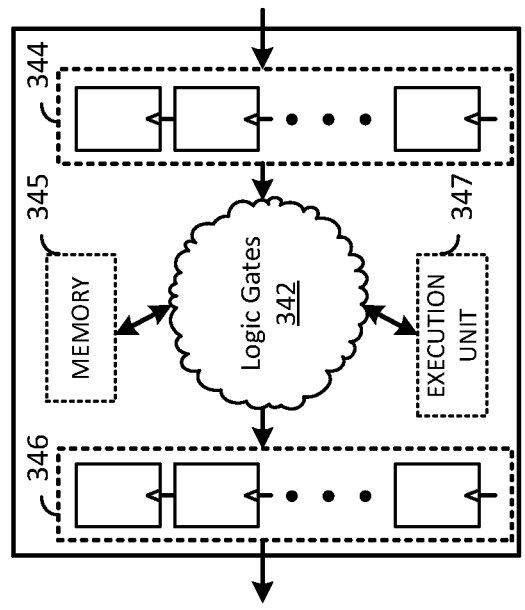

FIGS. 3B, 3C, and 3D are block diagrams illustrating various channel circuit blocks of the channel circuitry of the SoC of FIG. 1B according to the present disclosure. While some of the channel circuit blocks include data flip flops, other channel circuit blocks of the present disclosure may not include data flip flops and may simply include storage, logic gates, processing circuitry, or other structures. The channel circuit block 340 of FIG. 3B includes input data flip flops 344, output data flip flops 346, logic gates 342, optional memory 345, and optional execution unit 347. The channel circuit block 350 of FIG. 3C includes an input, logic gates 352, optional memory 355, optional execution unit 357, and output data flip flops 354. The channel circuit block 360 of FIG. 3D includes input data flip flops 364, logic gates 362, optional memory 365 and an optional execution unit 367. The execution units may perform operations over multiple clock cycles or over a single clock cycle.

Figure 4A:
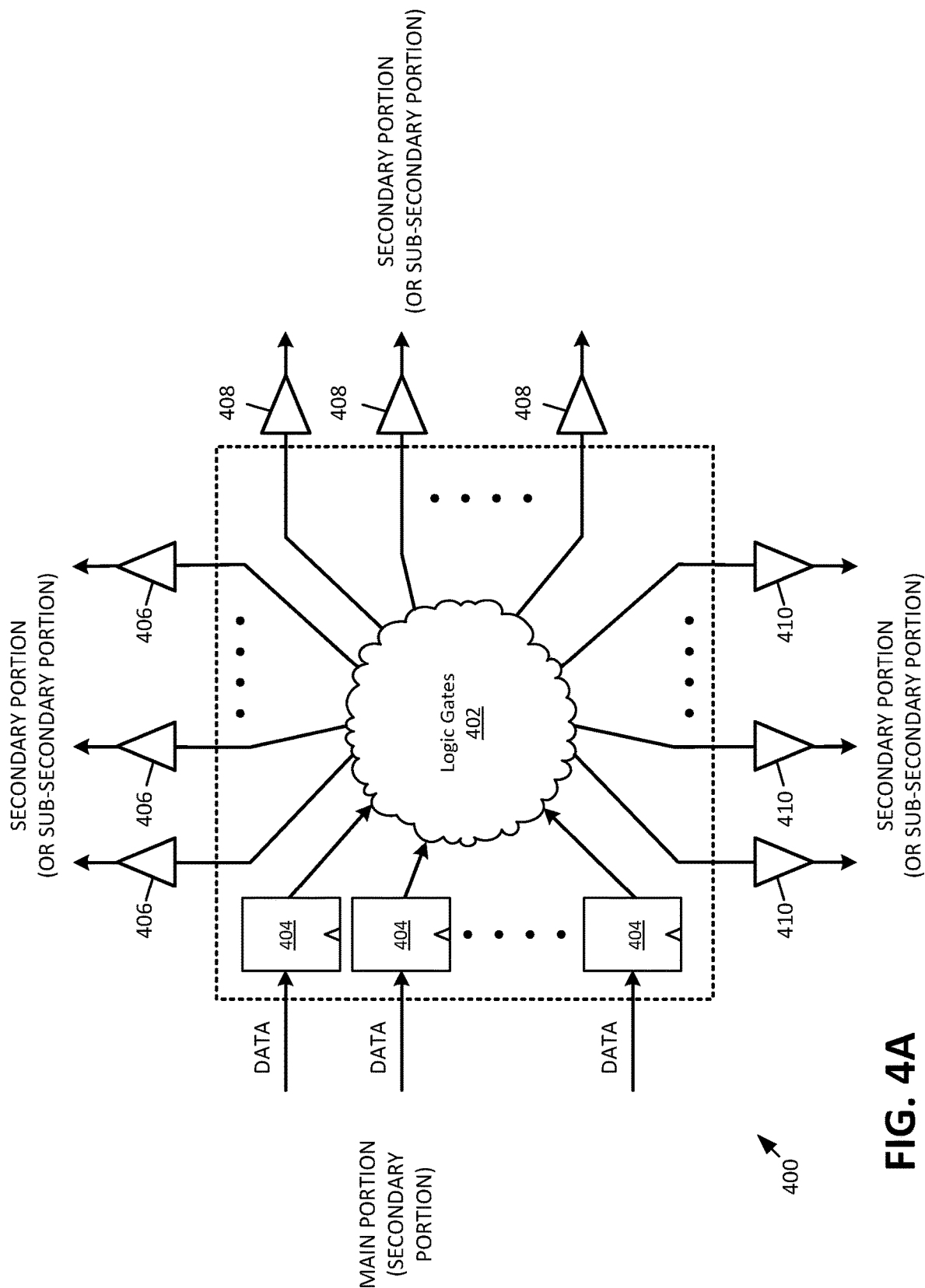
FIG. 4A is a block diagram illustrating a channel circuit block of the channel circuitry of the SoC of FIG. 1B that services multiplexing of first direction data according to an embodiment of the present disclosure.

FIG. 4A is a block diagram illustrating a channel circuit block 400 of the channel circuitry of the SoC of FIG. 1B that services multiplexing of first direction data according to an embodiment of the present disclosure. The channel circuit block 400 includes input data flip flops 404 and logic gates 402 that operate as a multiplexer to receive the first direction data and to provide the first direction data to one of three outputs. In one example, the channel circuit block 400 bridges first direction data from a main portion of the channel circuitry to three secondary portions of the channel circuitry via drivers 406 to a first portion, via drivers 408 to a second secondary portion, and via drivers 410 to a third secondary portion. In another example, the channel circuit block 400 bridges first direction data from a secondary portion of the channel circuitry to three sub-secondary portions of the channel circuitry via drivers 406 to a first sub-secondary portion, via drivers 408 to a second sub-secondary portion, and via drivers 410 to a third sub-secondary portion.

Figure 4B:
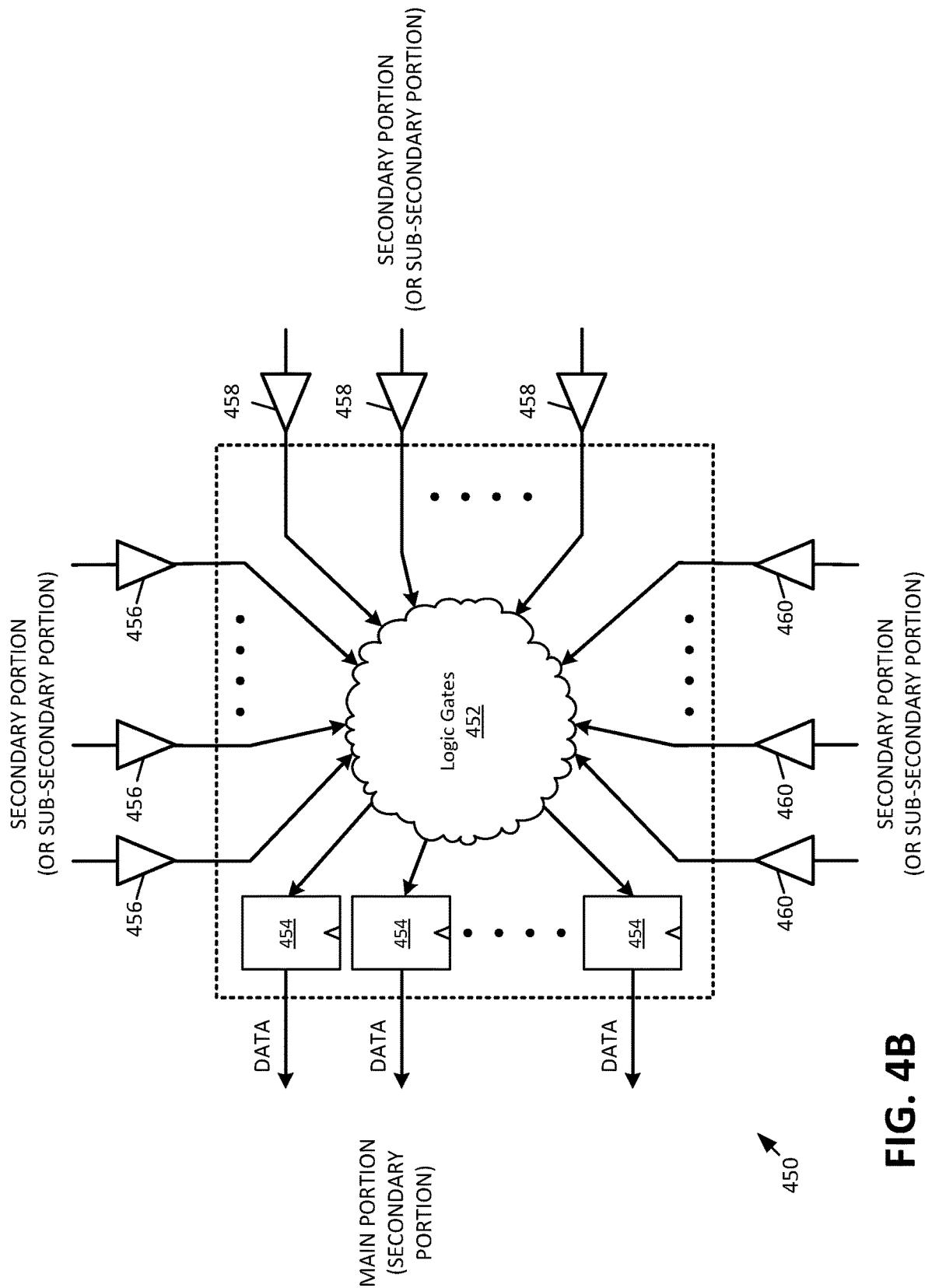
FIG. 4B is a block diagram illustrating a channel circuit block of the channel circuitry of the SoC of FIG. 1B that services multiplexing of second direction data according to an embodiment of the present disclosure.

FIG. 4B is a block diagrams illustrating a channel circuit block of the channel circuitry of the SoC of FIG. 1B that services multiplexing of second direction data according to an embodiment of the present disclosure. The channel circuit block 450 includes output data flip flops 454 and logic gates 452 that operate as a multiplexer to selectively receive second direction data from one of three inputs and provide it to one of the output. In a first example, the channel circuit block 450 selectively receives second direction data from a first secondary portion of the channel circuitry via drivers 456, from a second secondary portion of the channel circuitry via drivers 458, and from a third secondary portion of the channel circuitry via drivers 460 and selectively routes the second data to the main portion of the channel circuitry via the logic gates 452 and the output data flip flops 454. In a second example, the channel circuit block 450 selective receives second direction data from a first sub-secondary portion of the channel circuitry via drivers 456, from a second sub-secondary portion of the channel circuitry via drivers 458, and from a third sub-secondary portion of the channel circuitry via drivers 458 and selectively routes the second data to the secondary portion of the channel circuitry via the logic gates 452 and the output data flip flops 454.

Figure 5:
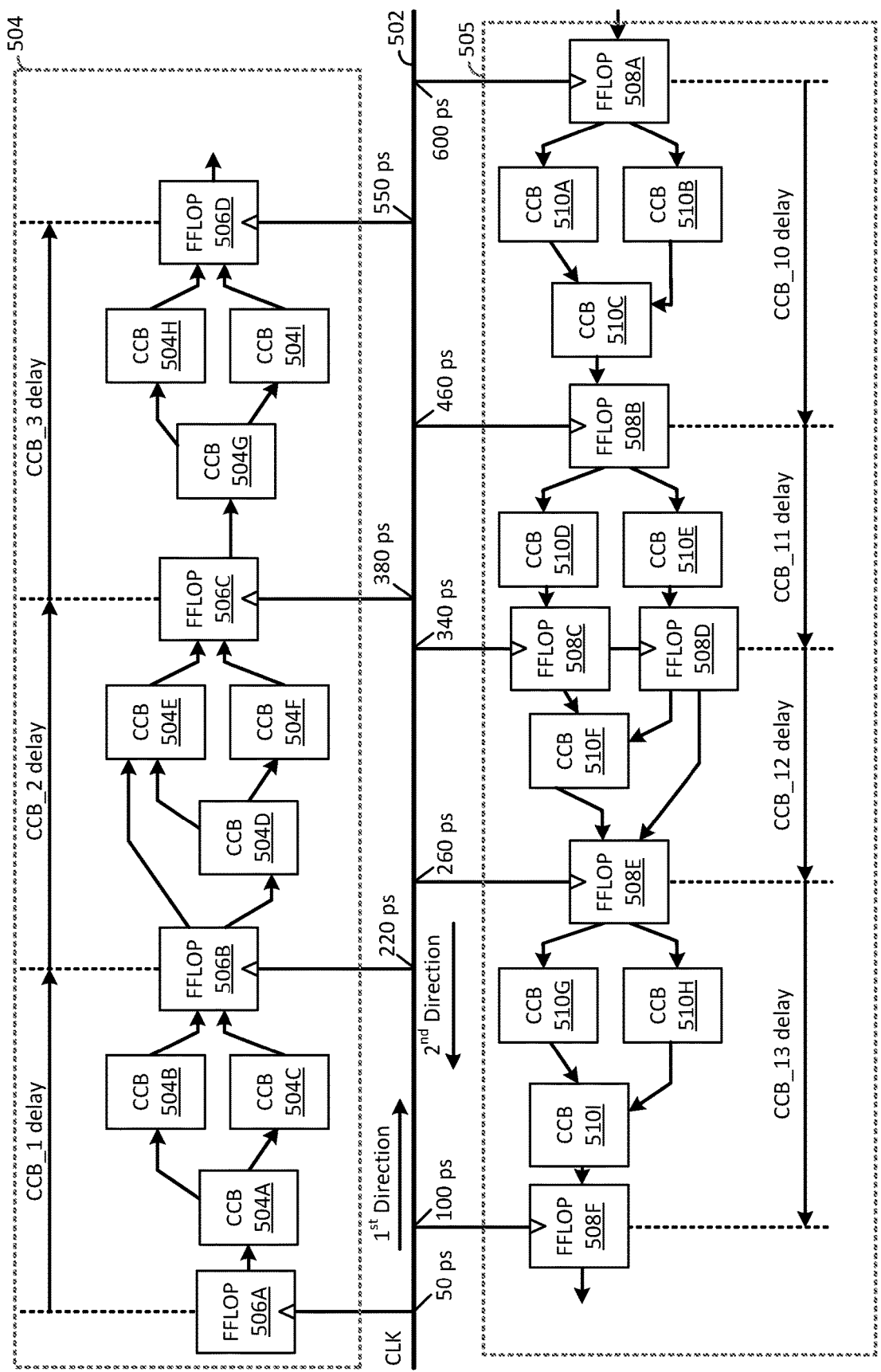
FIG. 5 is a block diagram illustrating another embodiment of channel circuitry of the SoC of FIG. 1B according to the present disclosure.

FIG. 5 is a block diagram illustrating another embodiment of channel circuitry of the SoC of FIG. 1B according to the present disclosure. The channel circuitry 500 illustrated in FIG. 5 is an example of a portion of the channel circuitry of the main portion 154, the secondary portions 156 and/or 158, and/or the sub-secondary portions 160 and/or 162 of FIG. 1B. The channel circuitry 500 of FIG. 5 includes a portion of the clock sprinkler circuit 502, a portion of the first direction data path circuitry 504, and a portion of the second direction data path circuitry 505. The portion of the clock sprinkler circuitry 502 illustrated in FIG. 5 services propagation of the clock signal in the first direction (as indicated). Shown are various clock skews and their relative locations along the clock sprinkler circuit 502.

The first direction data path circuitry 504 of FIG. 5 includes a plurality of first direction channel circuit blocks 504A-504I that may be clocked, or not, by the clock sprinkler circuit 502 and that are intercoupled by a plurality of first direction data flip flops 506A-506D that are clocked by the clock sprinkler circuit 502 and that, together, service data flow in the first direction. The second direction data path circuitry 505 of FIG. 5 includes a plurality of second direction channel circuit blocks 510A-510H that may be clocked by the clock sprinkler circuit 502 (now shown) and that are intercoupled by a plurality of second direction data flip flops 508A-508F that are clocked by the clock sprinkler circuit 502 and that, together, service data flow in the second direction.

With the embodiment of FIG. 5, propagation of the clock signal in the first direction introduces clock skew along the main clock branch as shown as 50 ps, 100 ps, 220 ps, 260 ps, 340 ps, 380 ps, 460 ps, 550 ps and 600 ps. These numbers are for illustration only. Further, propagation of first data on the first direction data path circuitry 504 introduces first data delay along the first direction data path circuitry. The first direction data path circuitry 504 has delay associated with the first direction channel circuit blocks (CCBs) 504A-504I due to their logic gates, their data flip flops, and the data paths therebetween. As is evident, therefore, the first data delay along the first direction data path circuitry 504 would then typically differ from the delay that caused the clock skew, and the first direction data will be out of sync with the clock signal. Thus, placement of the plurality of first direction data flip flops 506A-506D is determined based upon the clock skew and the first data delay along the first direction data path circuitry 504. In other words, the delay caused by the first direction data path circuitry causes clock/data skew in the first direction and placement of the first direction data flip flops 506A-506D must be sufficiently close together to preclude loss of data due to the delay of the first direction data. Further, the designs of the first direction channel circuit blocks 504A-504I must be so that their delay of operation does not cause there to be clock/data skew that would cause loss of data.

For example, CCB_1 delay is the delay of the channel circuit blocks 504A-504C between first direction data flip flops 506A and 506B, the clock-to-Q delay of flip flop 506A, and the setup time of flip flop 506B. The clock skew between first direction data flip flops 506A and 506B is 220 ps–50 ps=170 ps. If the clock period is, for example, 1000 ps, the clock-to-Q delay of flip flop 506A is 90 ps, and the setup time of flip flop 506B is 10 ps, then data propagation delay between first direction data flip flops 506A and 506B, CCB_1 delay, must be less than 1000 ps+170 ps–90 ps–10 ps=1070 ps. The placement of the first direction data flip flops 506A and 506B and the design of the first direction CCBs 504A, 504B, and 504C ensures that this requirement is met. Further, if all flip flops have the same clock-to-Q delays and setup times, the data propagation delay between first direction data flip flops 506B and 506C of CCBs 504D, 504E, and 504F must be less than 1000 ps+(380 ps–220 ps)–(90 ps+10 ps)=1060 ps. Moreover, the data propagation delay between first direction data flip flops 506C and 506D of CCBs 504G, 504H, and 504I must be less than 1000 ps+(550 ps–380 ps)–(90 ps+10 ps)=1070 ps. Thus, both the design of the first direction CCBs 504A-504I and the placement of the first direction data flip flops 506A-506D must be implemented to avoid data loss. Propagation of second data on the second direction data path circuitry 505 introduces second data delay along the second direction data path circuitry 505. The second direction data path circuitry 505 has delay associated with the second direction channel circuit blocks 510A-501H. The second data delay along the second direction data path circuitry 505 opposes the clock signal causing the clock/data skew to be greater in the second direction than in the first direction. Thus, placement of the plurality of second direction data flip flops 508A-508F is determined based upon the clock skew and the second data delay along the second direction data path circuitry 505. In other words, the placement of the second direction data flip flops 508A-508F must be sufficiently close together to preclude loss of data due to the delay in the second direction.

Generally, second direction data flip flops 508A-508F of the second direction data path circuitry 505 must have less data delay therebetween than the first direction data flip flops 506A-506D of the first direction data path circuitry 504 because the second data flow in the second direction opposes the propagation of the clock. Stated somewhat differently, clock/data skew in the second direction is greater than clock/data skew in the first direction and the second direction data flip flops 508A-508F must be located close enough together to prevent second direction data loss.

CCB_10 delay is the delay of the channel circuit blocks 510A-510C between second direction data flip flops 508A and 508B, the clock-to-Q delay of flip flop 508A, and the setup time of flip flop 508B. The clock skew between second direction data flip flops 508A and 508B is 460 ps–600 ps=–140 ps. Because the second data flows in the second direction that is opposite the first direction of the clock signal, the data propagation delay CCB_10 must be less than 1000 ps+(–140 ps)–(90 ps+10 ps)=760 ps to ensure that data is not lost. CCB_11 delay is the delay of the channel circuit block 510D between second direction data flip flops 508B and 508C and the channel circuit block 510E between flip flops 508B and 508D. To ensure that data is not lost between data flip flops 508B and 508C and between data flip flops 508B and 508D, the data propagation delay CCB_11 must be less than 1000 ps+(340 ps–460 ps)–(90 ps+10 ps)=780 ps. Likewise, to ensure that data is not lost between data flip flops 508C and 508E and between data flip flops 508D and 508E, the data propagation delay CCB_12 must be less than 1000 ps+(260 ps−340 ps)−(90 ps+10 ps)=820 ps. Moreover, to ensure that data is not lost between data flip flops 508E and 508F the data propagation delay CCB_13 must be less than 1000 ps+(100 ps−260 ps)−(90 ps+10 ps)=740 ps.

Thus, both the design of the second direction CCBs 510A-510I and the placement of the second direction data flip flops 508A-508F must be implemented to avoid data loss. As the reader appreciates, a higher clock frequency causes timing to be more critical because the clock period is smaller. Thus, a frequency of the clock is selected based upon the structure of the channel circuitry and the time constraints thereof. When a particular clock frequency of the channel circuitry is detected, the delay in the channel circuitry between flip flops must be less than a delay that would result in loss of data. Thus, the placement of data flip flops along the channel circuitry in combination with the logic of the channel circuitry is designed so that loss of data will not occur.

Figure 6:
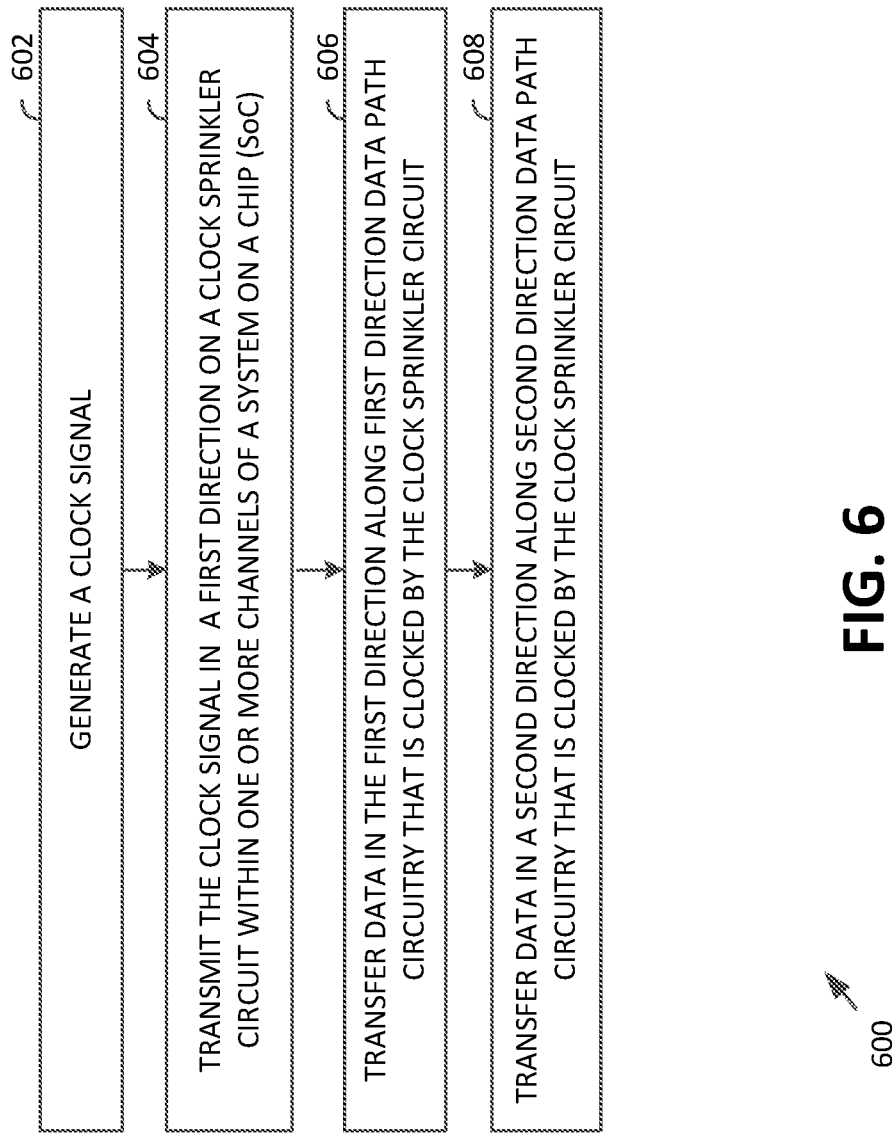
FIG. 6 is a flow chart illustrating a method for servicing data transfer by data path circuitry of channel circuitry according to an aspect of the present disclosure.

FIG. 6 is a flow chart illustrating a method for servicing data transfer by data path circuitry of channel circuitry according to an aspect of the present disclosure. The method 600 of FIG. 6 commences with generating a clock signal (step 602). The clock signal is then transmitted in a first direction on a clock sprinkler circuit within one or more channels of a SoC (step 604). Data is then transferred in a first direction along first direction data path circuitry that is clocked by the clock sprinkler circuit (step 606). Then, data is then transferred in a second direction along second direction data path circuitry that is clocked by the clock sprinkler circuit (step 608).

FIG. 7 is a flow chart illustrating a method for selectively enabling data flip flops and clock drivers according to an aspect of the present disclosure. The method 650 of FIG. 7 will be described in conjunction with the structures of FIG. 3A. The method 650 of FIG. 7 commences with selecting/determining a channel circuitry data rate (step 652). The data rate may be specific to first direction data transfer and/or second direction data transfer. When it is determined that a full data rate is selected/determined at step 654, operation continues with enabling a full set of data flip flops on the first direction data path circuitry and/or the second direction data path circuitry to service the full data rate as illustrated (step 656). Further, when it is determined that full data rate is selected/determined at step 654, operation continues with enabling a full set of clock drivers 339 on the clock sprinkler circuit to service the full data rate (step 658). Data is then transferred on the first direction data path circuitry and/or the second direction data path circuitry at the full data rate (step 660) and, when done, operation returns to step 652.

When it is determined that a partial data rate is selected/determined at step 654, operation continues with enabling a partial set of data flip flops on one or both of the first direction data path circuitry and the second direction data path circuitry to service the partial data rate as (step 662). Further, when it is determined that partial data rate is selected/determined at step 654, operation continues with enabling a partial set of clock drivers on the clock sprinkler circuit to service the partial data rate (step 664). Data is then transferred on the first direction data path circuitry and/or the second direction data path circuitry at the partial data rate (step 666) after which operation returns to step 652.

According to an aspect of the operations of FIG. 7, the partial set of data flip flops on the data path circuitry and the partial set of clock drivers on the clock sprinkler circuit may vary in number depending upon the relative reduced data rate. Generally, the clock signal rate varies proportionately with the data rate. Thus, as the data rate gets relatively lower, fewer clock drivers and fewer data flip flops are required to service the transfer of data along the data path circuitry without data loss due to clock skew and differences in propagation delays along the data path circuitry as compared to clock skew along the clock sprinkler circuit. Further, the direction of data propagation on the data path circuitry may also be considered in the determination of the partial set of data flip flops during partial data rate data transfers. For example, partial data rate transfer in the first direction may require fewer data flip flops than does transfer in the second direction FIG. 8A is a block diagram illustrating a data path circuitry junction according to an aspect of the present disclosure. The junction 800 of FIG. 8A includes a data latch 802 that is clocked by the clock sprinkler circuit and a multiplexer 804 controlled by a select signal to selectively couple data between the data latch 802 and data path circuitry 808A, 808B, and/or 808C. The data path circuitry junction 800 of FIG. 8A may serve the coupling of data between a main portion and multiple secondary portions of the data path circuitry or the coupling of data between a secondary portion and multiple sub-secondary portions of the data path circuitry, both in the first and second directions.

Figure 8B:
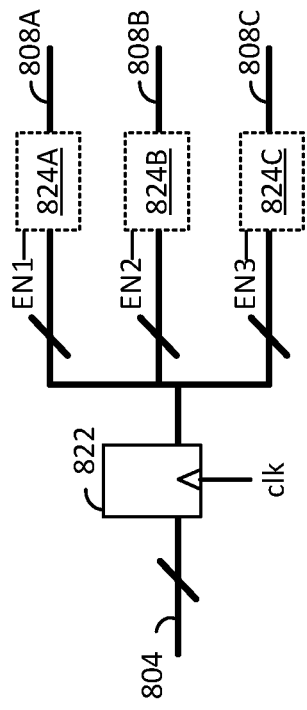
FIG. 8B is a block diagram illustrating a data path junction according to another aspect of the present disclosure.
Figure 8A:
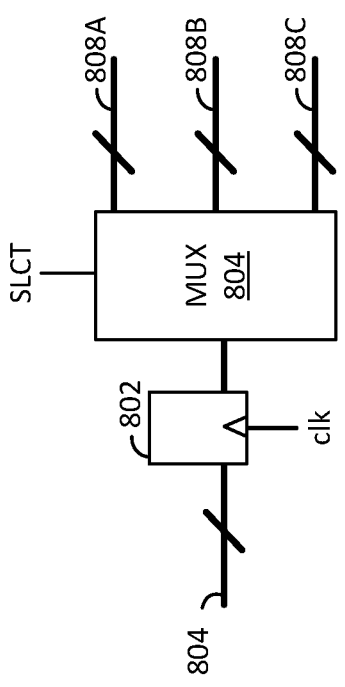
FIG. 8A is a block diagram illustrating a data path junction according to an aspect of the present disclosure.

FIG. 8B is a block diagram illustrating a data path junction according to an aspect of the present disclosure. The data path junction 820 of FIG. 8B includes a data latch 822 that is clocked by the clock sprinkler circuit and three optional controlled switches 824A, 824B, and 824C controlled by select signals to selectively couple data between the data latch 802 and data path circuitry 808A, 808B, and/or 808C. The data path junction 820 of FIG. 8B may serve the coupling of data between a main portion and multiple secondary portions of the data path circuitry or the coupling of data between a secondary portion and multiple sub-secondary portion of the data path circuitry, both in the first and second directions.

Figure 8D:
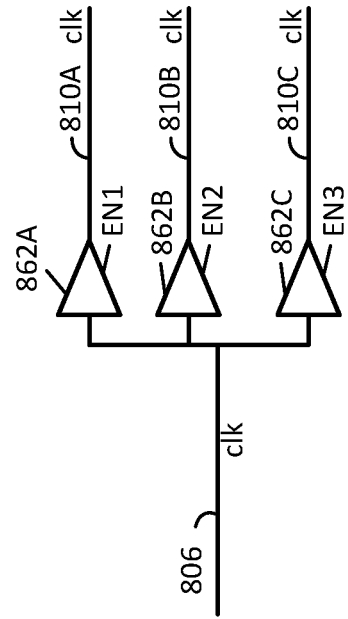
FIG. 8D is a block diagram illustrating a clock sprinkler connection according to another aspect of the present disclosure.
Figure 8C:
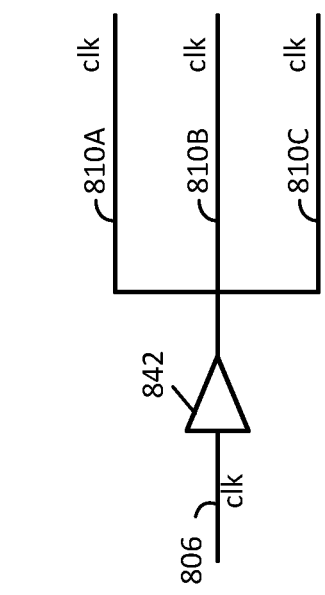
FIG. 8C is a block diagram illustrating a clock sprinkler connection according to an aspect of the present disclosure.

FIG. 8C is a block diagram illustrating a clock sprinkler connection according to an aspect of the present disclosure. The clock sprinkler connection 840 of FIG. 8B includes a driver 842 having its input coupled to receive a clock signal on a main clock branch 806 and to produce a driven clock signal output to each of secondary clock branches 810A, 810B, and 810C. The clock sprinkler connection 840 of FIG. 8A may also serve as a clock sprinkler sub-connection to couple a secondary clock branch to multiple sub-secondary clock branches.

FIG. 8D is a block diagram illustrating a clock sprinkler structure connection to another aspect of the present disclosure. The clock sprinkler connection 860 of FIG. 8B includes an input coupled to receive the clock signal on the main clock branch 806 and to produce a driven clock signal output to each of secondary clock branches 810A, 810B, and 810C via respective drivers 862A, 862B, and 862C. The drivers 862A, 862B, and 862C may be separately enabled, enabled in unison, or always on. The clock sprinkler connection 860 may be the clock sprinkler connection between a main clock branch and secondary clock branches. The clock sprinkler connection 860 of FIG. 8D may alternately serve as a clock sprinkler sub-connection to couple a secondary clock branch to multiple sub-secondary clock branches.

Figure 9:
FIG. 9 is a flow chart illustrating a method for designing a SoC according to an embodiment of the present disclosure.

FIG. 9 is a flow chart illustrating a method for designing a SoC according to an aspect of the present disclosure. The method 1000 for designing the SoC begins with locating a plurality of processing systems on the SoC (step 1002). Such location results in a structure similar to the structure illustrated in FIG. 1B. The method 1000 continues with routing first direction data path circuitry in the channel among the plurality of processing systems (step 1004). The method 1000 continues with routing second direction data path circuitry in the channel among the plurality of processing systems (step 1006). The method 1000 then includes routing a clock sprinkler circuit in the channel among the plurality of processing systems (step 1008).

The method 1000 continues with determining clock skew in the first direction along the clock sprinkler circuit (step 1010). Examples of clock skew are described herein with reference to FIGS. 2, 3A and 5. Then, the method 1000 includes determining clock/data skew in the first direction along the first direction data path circuitry (step 1012). The method then includes locating a plurality of data flip flops along the first direction data path circuitry based upon the clock/data skew in the first direction along the first direction data path circuitry (step 1014).

The method 1000 continues with determining clock/data skew in the second direction along the second direction data path circuitry (step 1016). The method concludes with locating a plurality of data flip flops along the second direction data path circuitry based upon the clock/data skew in the second direction along the second direction data path circuitry (step 1018).

According to another aspect of the present disclosure, the method 1000 further includes locating a plurality of clock drivers along the clock sprinkler circuit. According to another aspect of the present disclosure, the method 1000 further includes routing the first direction data path circuitry and the second direction data path circuitry among the plurality of processing systems by routing the data path circuitry along a first route within metal layers of the SoC. This aspect may further include routing the clock sprinkler circuit along a second route within metal layers of the SoC, the second route different than the first route. According to these aspects, propagation delay along the first route within the metal layers of the SoC differs from propagation delay along the second route within the metal layers of the SoC and the method further includes locating the plurality of data flip flops based upon differences in propagation delay between the first route and the second route.

Figure 10:
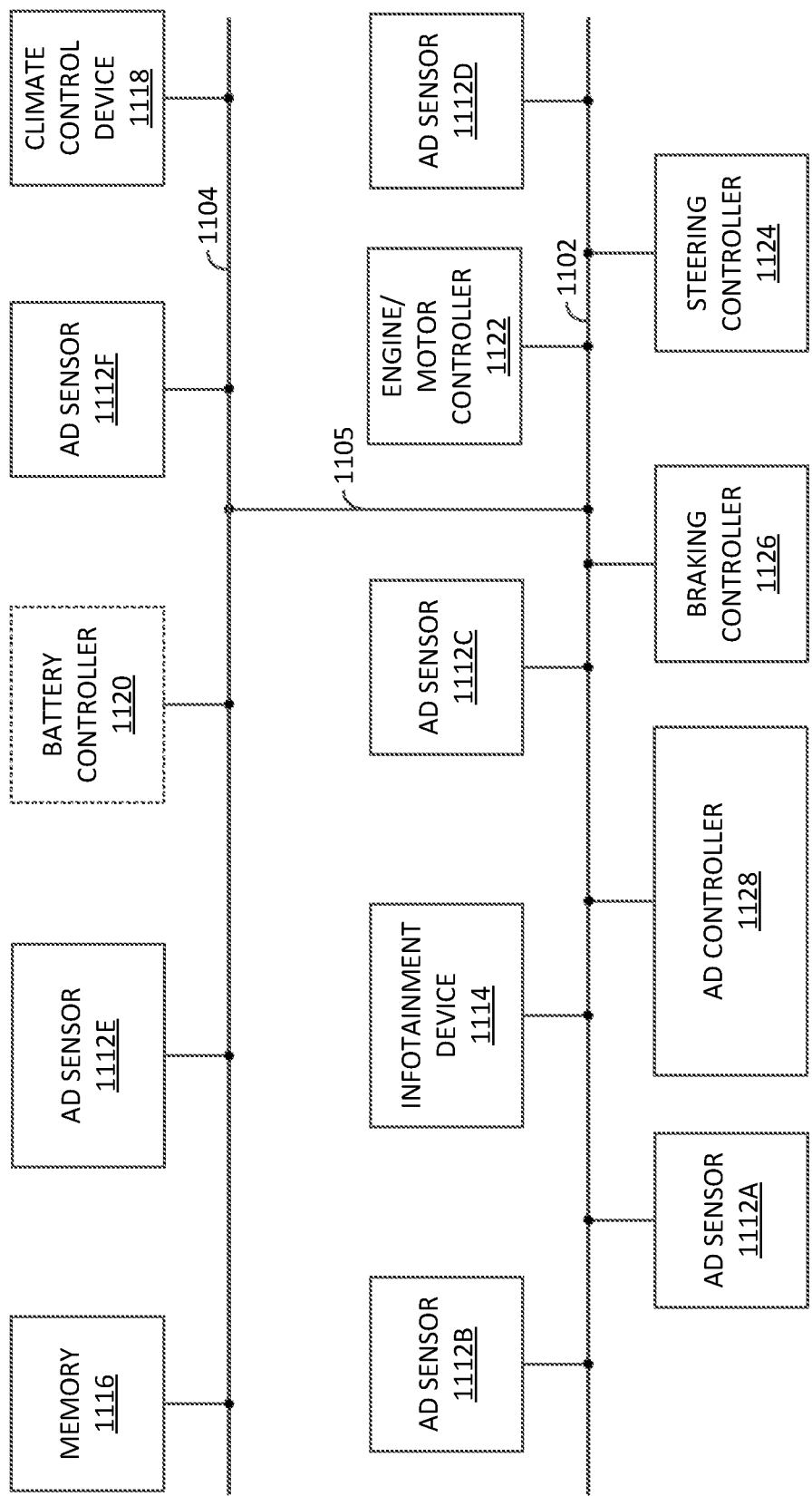
FIG. 10 is a block diagram illustrating an autonomous driving controller constructed and operating according to a first described embodiment.

FIG. 10 is a block diagram illustrating an autonomous driving system 1100 constructed and operating according to a described embodiment. The autonomous driving system 1100 may service an automobile, a truck, a bus, or another vehicle. The vehicle may be diesel powered, gas powered, electric powered, natural gas powered, hydrogen powered, a hybrid, or any other type of vehicle. The autonomous driving system 1100 includes a bus, an autonomous driving controller 1128 coupled to the bus and a plurality of autonomous driving sensors 1112A-1112F coupled to the bus. Additional devices coupled to the bus include an infotainment device 1114, memory 1116, a climate control device 1118, a battery controller 1120 (when the vehicle is an electric vehicle or hybrid vehicle), an engine/motor controller 1122, a steering controller 1124, and a braking controller 1126. Note that the communication connectivity via the bus may be different in differing embodiments.

The plurality of autonomous driving sensors 1112A-1112F may include one or more RADAR units, one or more LIDAR units, one or more cameras, and/or one or more proximity sensors. The plurality of autonomous driving sensors 1112A-1112F collect autonomous driving data and transmit the collected autonomous driving data to the autonomous driving controller 1128 on the bus.

In the embodiment of FIG. 11, the bus includes two interconnected sections. A first section of the bus 1102 includes one or more conductors, a second section of the bus 1104 includes one or more conductors, and an interconnecting portion 1105 that interconnects the first 1102 and second 1104 sections of the bus. The bus may be a twisted pair of conductors, a pair of strip conductors, a coaxial conductor, a two-conductor power bus that carries DC power, or another structure including one or two conductors to support communications.

The communications serviced within the autonomous driving system 1100 via the bus may operate consistently with a broadband Power Line Communication (PLC) operating standard as modified according to the present disclosure. Broadband PLC operating standards typically specify carrier frequencies of 1.8-250 MHz and support relatively high data rates up to hundreds of Mbps. Specifications for PLC include the Universal Powerline Association, SiConnect, the HD-PLC Alliance, Xsilon and the ITU-T's G.hn specifications. Other specifications, including the HomePlug AV and IEEE 1901 standards specify how data is supported. PLCs are designed to be robust in noisy environments. Vehicles, particularly electric vehicles, include components that create noise. The PLCs are wells suited to broadband communications within an automobile, considering their accommodation for noise on servicing conductor(s).

Figure 11B:
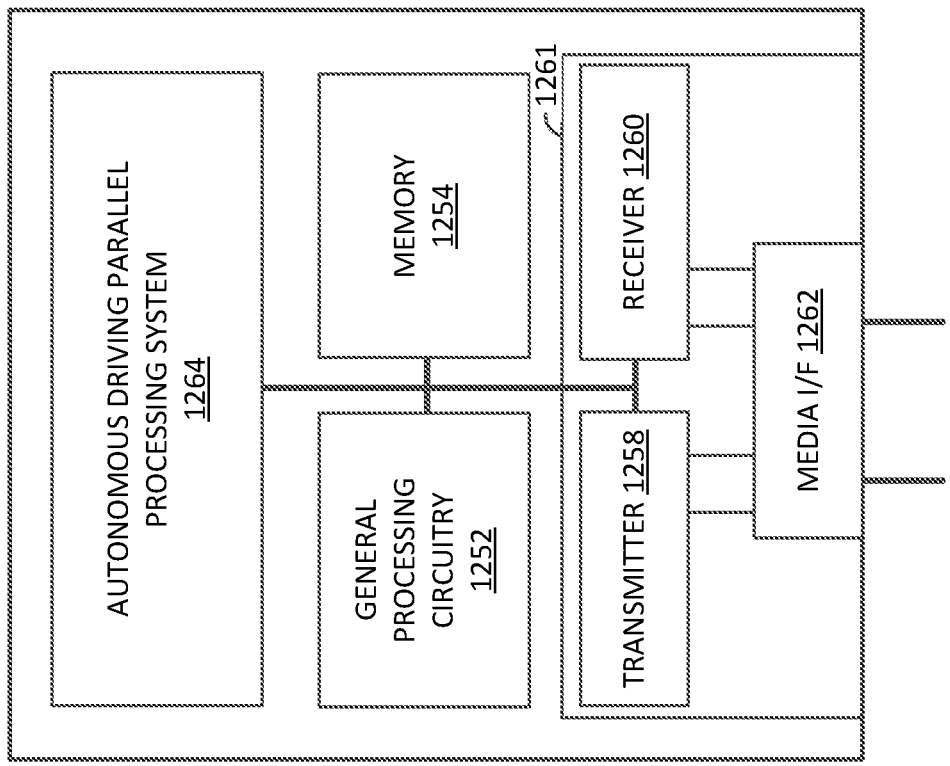
FIG. 11B is a block diagram illustrating an autonomous driving controller constructed according to a described embodiment.
Figure 11A:
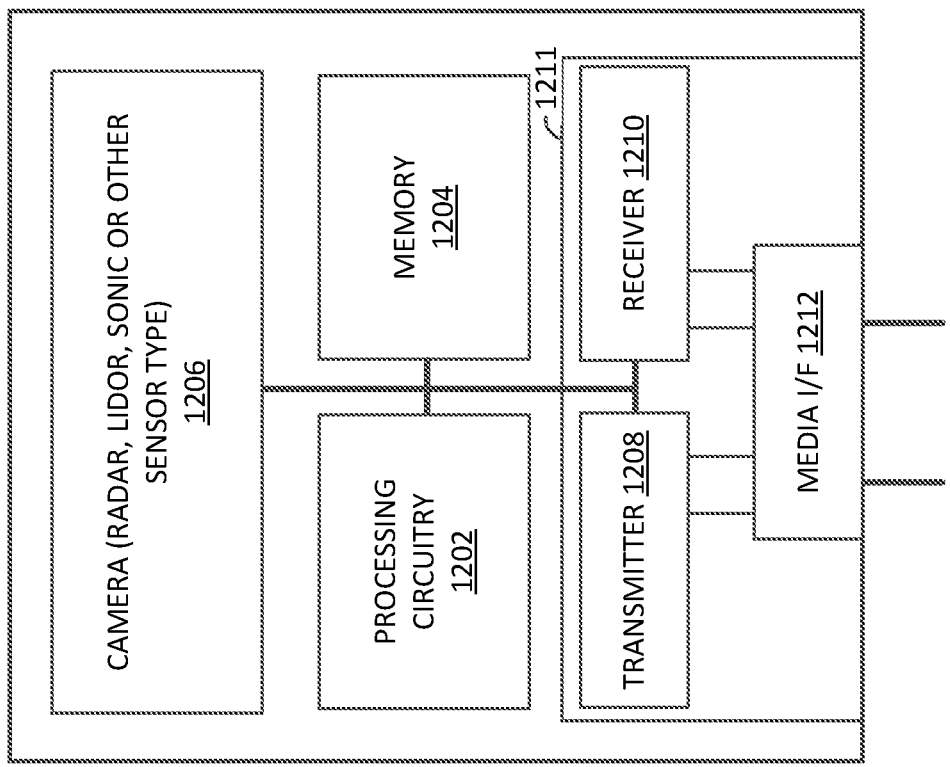
FIG. 11A is a block diagram illustrating an autonomous driving sensor constructed according to a described embodiment.

FIG. 11A is a block diagram illustrating an autonomous driving sensor constructed according to a described embodiment. The autonomous driving sensor 1200 may be constructed at least partially as a SoC according to the embodiments previously described herein. The autonomous driving sensor 1200 includes data collection component 1206 configured to collect autonomous driving data. The data collection component 1206 may be a RADAR sensor, a LIDAR sensor, a sonic proximity sensor, or another type of sensor. The autonomous driving sensor 1200 further includes processing circuitry 1202, memory 1204, and a transceiver 1211 coupled to the processing circuitry 1202, to the memory 1204, and to the data collection component 1206 via a bus. The processing circuitry 1202 executes programs stored in memory 1204, e.g., data and instructions to support autonomous driving operations, to interact with the data collection component 1206 to control the collection of autonomous driving data, to process the autonomous driving data, and to interact with the transceiver 1211 to communicate via the bus, among other operations.

By way of example and not limitation, processing circuitry 1202 may be a central processing unit, a microcontroller, a digital signal processor, an application specific integrated circuit, a Judging unit, a Determining Unit, an Executing unit, combinations of any of the foregoing, or any other device suitable for execution of computer programs. By way of example, memory 1204 may be dynamic memory, static memory, disk drive(s), flash drive(s), combinations of any of the foregoing, or any other form of computer memory. The memory 1204 stores computer programs for operations of the present disclosure, may also store other computer programs, configuration information, and other short-term and long-term data necessary for implementation of the embodiments of the present disclosure.

The transceiver 1211 includes a transmitter 1208, a receiver 1210, and a media I/F 1212. The media I/F 1212 may be a transmit/receive (T/R) switch, a duplexer, or other device that supports the illustrated coupling. In other embodiments, both the transmitter 1208 and receiver 1210 couple directly to the bus or couple to the bus other than via the media I/F 1212. The transceiver 1211 supports communications via the bus. The processing circuitry 1202 and the transceiver 1211 are configured to transmit autonomous driving data to the autonomous driving controller 1128 on the bus.

FIG. 11B is a block diagram illustrating an autonomous driving controller constructed according to a described embodiment. The autonomous driving controller 1128 may be constructed at least partially as a SoC according to the embodiments previously described herein. The autonomous driving controller 1128 includes general processing circuitry 1252, memory 1254, and a transceiver 1261 coupled to the general processing circuitry 1252 and configured to communicate with a plurality of autonomous driving sensors via the bus. The autonomous driving controller 1128 also includes an autonomous driving parallel processing system 1264 that operates on autonomous driving data received from the autonomous driving sensors and supports autonomous driving operations. The transceiver 1261 includes a transmitter 1258, a receiver 1260, and a media I/F 1262 that in combination support communications via the bus.

The construct of the general processing circuitry 1252 may be similar to the construct of the processing circuitry 1202 of the autonomous driving sensor 1200. The autonomous driving parallel processing system 1264 will be described further herein with reference to FIGS. 4-14. The memory 1254 may be of similar structure as the memory 1204 of the autonomous driving sensor 1200 but with capacity as required to support the functions of the autonomous driving controller 1128.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

Routines, methods, steps, operations, or portions thereof described herein may be implemented through electronics, e.g., one or more processors, using software and firmware instructions. A "processor" or "processing circuitry" includes any hardware system, hardware mechanism or hardware component that processes data, signals or other information. A processor can include a system with a central processing unit, multiple processing units, dedicated circuitry for achieving functionality, or other systems. Some embodiments may be implemented by using software programming or code in one or more digital computers or processors, by using application specific integrated circuits (ASICs), programmable logic devices, field programmable gate arrays (FPGAs), optical, chemical, biological, quantum or nano-engineered systems, components and mechanisms. Based on the disclosure and teachings representatively provided herein, a person skilled in the art will appreciate other ways or methods to implement the teachings herein.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B are true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted therewith.

What is claimed is:

1. A System on a Chip (SoC) comprising:
a plurality of processing systems; and
channel circuitry coupled to and residing among the plurality of processing systems, the channel circuitry including:
a clock distribution circuit including a main clock branch;
a clock source coupled to a first end of the main clock branch, the clock source coupling a clock signal to the first end of the main clock branch and that propagates in a first direction along the main clock branch from the first end of the main clock branch towards a second end of the main clock branch;
first direction data path circuitry including:
a plurality of first direction data flip flops coupled to the main clock branch and clocked by the clock signal propagating in the first direction along the main clock branch; and
first direction combinational logic intercoupled to the plurality of first direction data flip flops,
wherein the first direction data flip flops and the first direction combinational logic service data flow from the first end towards the second end in the first direction; and
second direction data path circuitry including:
a plurality of second direction data flip flops coupled to the main clock branch and clocked by the clock signal propagating in the first direction along the main clock branch; and
second direction combinational logic intercoupled to the plurality of second direction data flip flops,
wherein the second direction data flip flops and second direction combinational logic service data flow from the second end towards the first end in a second direction that is opposite to the first direction, such that the serviced data flow opposes propagation of the clock signal.

2. The System on a Chip of claim 1, wherein:
propagation of the clock signal in the first direction introduces clock skew along the main clock branch;

propagation of first data on the first direction data path circuitry introduces first data delay along the first direction data path circuitry;

placement of the plurality of first direction data flip flops is determined based upon the clock skew and the first data delay along the first direction data path circuitry;

propagation of second data on the second direction data path circuitry introduces second data delay along the second direction data path circuitry; and placement of the plurality of second direction data flip flops is determined based upon the clock skew and the second data delay along the second direction data path circuitry.

3. The System on a Chip of claim 1, wherein:

skew in the second direction is greater than skew in the first direction, the skew being indicative of at least one of clock skew or data skew;

the first direction data flip flops are located based upon the skew in the first direction; and the second direction data flip flops are located based upon the skew in the second direction.

4. The System on a Chip of claim 1, wherein:

the plurality of processing systems has a respective plurality of processing system areas on a semiconductor die;

the channel circuitry resides in a channel circuitry area on the semiconductor die; and the channel circuitry area and the respective plurality of processing system areas are non-overlapping.

5. The System on a Chip of claim 1, wherein the clock distribution circuit further comprises a plurality of clock drivers and during a reduced power mode operation some of the plurality of clock drivers are disabled.

6. The System on a Chip of claim 1, wherein a processing system of the plurality of processing systems includes a local clock domain that is based upon the clock signal.

7. The System on a Chip of claim 1, wherein:

the clock distribution circuit further includes:

a clock distribution connection coupled to the second end of the main clock branch; and a plurality of secondary clock branches; and the first direction data path circuitry further includes, for each of the plurality of secondary clock branches, first direction secondary data path circuitry having:

a plurality of first direction secondary data flip flops clocked by a corresponding secondary clock branch and servicing data flow in the first direction data; and first direction secondary combinational logic coupled to the plurality of first direction secondary data flip flops and servicing data flow in the first direction; and the second direction data path circuitry further includes, for each of the plurality of secondary clock branches, second direction secondary data path circuitry having:

a plurality of second direction secondary data flip flops clocked by the corresponding secondary clock branch and servicing data flow in the second direction data; and second direction secondary combinational logic coupled to the plurality of second direction secondary data flip flops and servicing data flow in the second direction.

8. The System on a Chip of claim 7, wherein:

the clock signal propagates in the first direction through the clock distribution connection and along each of the plurality of secondary clock branches introducing clock skew along each of the plurality of secondary clock branches;

propagation of first data on the first direction secondary data path circuitry introduces first secondary data delay;

placement of the plurality of first direction secondary data flip flops is determined based upon the clock skew along the plurality of secondary clock branches and the first secondary data delay;

propagation of second data on the second direction secondary data path circuitry introduces second secondary data delay; and placement of the plurality of second direction secondary data flip flops is determined based upon the clock skew along the plurality of secondary clock branches and the second secondary data delay.

9. The System on a Chip of claim 8, wherein:

the clock distribution circuit further includes:

a clock distribution sub-connection coupled to the second end of a secondary clock branch; and a plurality of sub-secondary clock branches; and the first direction data path circuitry further includes, for each of the plurality of sub-secondary clock branches:

a plurality of first direction sub-secondary data flip flops clocked by a corresponding sub-secondary clock branch and servicing data flow in the first direction data; and first direction sub-secondary combinational logic coupled to the plurality of first direction sub-secondary data flip flops and servicing data flow in the first direction; and the second direction data path circuitry further includes, for each of the plurality of secondary clock branches:

a plurality of second direction sub-secondary data flip flops clocked by the corresponding sub-secondary clock branch and servicing data flow in the second direction data; and second direction sub-secondary combinational logic coupled to the plurality of second direction sub-secondary data flip flops and servicing data flow in the second direction.

10. A System on a Chip (SoC) comprising:

a plurality of processing systems; and channel circuitry coupled to and residing among the plurality of processing systems, the channel circuitry including:

a clock distribution circuit including a main clock branch;

a clock source coupled to a first end of the main clock branch, the clock source coupling a clock signal to the first end of the main clock branch and that propagates in a first direction along the main clock branch from the first end of the main clock branch towards a second end of the main clock branch;

first direction data path circuitry that includes a plurality of first direction channel circuit blocks, the first direction channel circuit blocks including:

first direction logic gates, and a plurality of first direction data flip flops coupled to the main clock branch and clocked by the clock distribution circuit, wherein the first direction logic gates and first direction data flip flops service data flow from the first end towards the second end in the first direction; and second direction data path circuitry that includes a plurality of second direction channel circuit blocks, the second direction data path circuitry including:

second direction logic gates, and a plurality of second direction data flip flops coupled to the main clock branch and clocked by the clock distribution circuit, wherein the second direction logic gates and second direction data flip flops service data flow from the second end towards the first end in a second direction that is opposite to the first direction such that the serviced data flow opposes propagation of the clock signal.

11. The System on a Chip of claim 10, wherein:
propagation of the clock signal in the first direction introduces clock skew along the main clock branch;
propagation of first data on the first direction data path circuitry introduces first data delay along the first direction data path circuitry;
placement of the plurality of first direction data flip flops is determined based upon the clock skew and the first data delay along the first direction data path circuitry;
propagation of second data on the second direction data path circuitry introduces second data delay along the second direction data path circuitry; and
placement of the plurality of second direction data flip flops is determined based upon the clock skew and the second data delay along the second direction data path circuitry.

12. The System on a Chip of claim 10, wherein:
skew in the second direction is greater than skew in the first direction, the skew being indicative of at least one of clock skew or data skew;
the first direction data flip flops are located based upon the skew in the first direction; and
the second direction data flip flops are located based upon the skew in the second direction.

13. The System on a Chip of claim 10, wherein:
the plurality of processing systems has a respective plurality of processing system areas on a semiconductor die;
the channel circuitry resides in a channel circuitry area on the semiconductor die; and
the channel circuitry area and the respective plurality of processing system areas are non-overlapping.

14. The System on a Chip of claim 10, wherein the clock distribution circuit further comprises a plurality of clock drivers and during a reduced power mode operation some of the plurality of clock drivers are disabled.

15. The System on a Chip of claim 10, wherein:
the clock distribution circuit further includes:
a clock distribution connection coupled to the second end of the main clock branch; and
a plurality of secondary clock branches; and
the first direction data path circuitry further includes, for each of the plurality of secondary clock branches, first direction secondary data path circuitry having a plurality of first direction secondary channel circuit blocks that service data flow in the first direction; and
the second direction data path circuitry further includes, for each of the plurality of secondary clock branches, second direction secondary data path circuitry having a plurality of second direction secondary channel circuit blocks that service data flow in the second direction.

16. The System on a Chip of claim 15, wherein:
the clock signal propagates in the first direction through the clock distribution connection and along each of the plurality of secondary clock branches introducing clock skew along each of the plurality of secondary clock branches;
propagation of first data on the first direction secondary data path circuitry introduces first secondary data delay along the first direction secondary data path circuitry;
placement of a plurality of first direction secondary data blocks is determined based upon the clock skew along the plurality of secondary clock branches and the first secondary data delay along the first secondary direction data path circuitry;
propagation of second data on the second direction secondary data path circuitry introduces second secondary data delay along the second direction secondary data path circuitry; and
placement of a plurality of second direction secondary data blocks is determined based upon the clock skew along the plurality of secondary clock branches and the second secondary data delay along the second secondary direction data path circuitry.

17. The System on a Chip of claim 15, wherein:
the clock distribution circuit further includes:
a clock distribution sub-connection coupled to the second end of a secondary clock branch; and
a plurality of sub-secondary clock branches; and
the first direction data path circuitry further includes, for each of the plurality of sub-secondary clock branches, a plurality of first direction sub-secondary channel circuit blocks that service data flow in the first direction; and
the second direction data path circuitry further includes, for each of the plurality of secondary clock branches, a plurality of second direction sub-secondary channel circuit blocks that service data flow in the second direction.

18. A method for operating a System on a Chip (SoC) including a plurality of processing systems, the method comprising:
generating a clock signal;
transmitting the clock signal in a first direction on a clock distribution circuit within one or more channels of the SoC along a main clock branch, the clock signal propagating from a first end of the main clock branch towards a second end of the main clock branch, the clock signal having clock skew along the clock distribution circuit;
transferring data within one or more channels of the SoC in the first direction along first direction data path circuitry which is coupled to the main clock branch, the first direction data path circuitry including a plurality of first direction channel circuit blocks that service data flow in the first direction from the first end towards the second end, and that are clocked by the clock distribution circuit, and that intercouple the plurality of first direction channel circuit blocks; and
transferring data within the one or more channels of the SoC in a second direction from the second end towards the first end, the second direction being opposite to the first direction, the data being transferred along second direction data path circuitry that includes a plurality of second direction channel circuit blocks coupled to the main clock branch that service data flow in the second direction, and that are clocked by the clock signal on the clock distribution circuit, and that intercouple the plurality of second direction channel circuit blocks, such that the serviced data flow opposes propagation of the clock signal.

19. The method of claim 18, wherein:
propagation of first data on the first direction data path circuitry introduces first data delay along the first direction data path circuitry;

placement of a plurality of first direction data flip flops is determined based upon the clock skew and the first data delay along the first direction data path circuitry;

propagation of second data on the second direction data path circuitry introduces second data delay along the second direction data path circuitry; and placement of a plurality of second direction data flip flops is determined based upon the clock skew and the second data delay along the second direction data path circuitry.

20. The method of claim 18, wherein:

skew in the second direction is greater than skew in the first direction, the skew being indicative of at least one of clock skew or data skew;

a plurality of first direction data flip flops are located based upon the skew in the first direction; and a plurality of second direction data flip flops are located based upon the skew in the second direction.

* * * * *